(12) United States Patent
Kim

(10) Patent No.: US 9,996,967 B2
(45) Date of Patent: Jun. 12, 2018

(54) IMAGING APPARATUS AND IMAGING METHOD

(71) Applicant: SAMSUNG ELECTRONICS CO., LTD., Suwon-si (KR)

(72) Inventor: Yun-Tae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 14/934,484

(22) Filed: Nov. 6, 2015

(65) Prior Publication Data

US 2016/0133042 A1    May 12, 2016

(30) Foreign Application Priority Data

Nov. 6, 2014    (KR) .................. 10-2014-0153923

(51) Int. Cl.
*G06T 15/08* (2011.01)
*G06K 9/52* (2006.01)
(Continued)

(52) U.S. Cl.
CPC ............. *G06T 15/08* (2013.01); *G06K 9/52* (2013.01); *G06K 9/6215* (2013.01);
(Continued)

(58) Field of Classification Search
CPC ......... A61B 8/483; A61B 8/5207; A61B 8/08; A61B 6/503; A61B 6/5205; A61B 6/5264; A61B 6/504; A61B 6/466; A61B 6/5235; A61B 5/0013; A61N 2005/1072; G06F 19/3437; G06T 2207/10081; G06T 2207/10088; G06T 7/0012;
(Continued)

(56) References Cited

U.S. PATENT DOCUMENTS 7,454,038 B1   11/2008  Ruzon
7,606,420 B1   10/2009  Ruzon
(Continued)

OTHER PUBLICATIONS

Pedro F. Felzenszwalb et al., Efficient Belief Propagation for Early Vision, International Journal of Computer Vision 70(1), 41-54, 2006.*

(Continued)

*Primary Examiner* — Haixia Du
(74) *Attorney, Agent, or Firm* — Sughrue Mion, PLLC

(57) ABSTRACT

An image processing apparatus generates intermediate volume data from a plurality of volume data segments obtained as time passes so as to implement high-speed volume data. A medical imaging apparatus that includes the image processing apparatus, an ultrasonic imaging apparatus, an image processing method, and a medical image generation method are disclosed. The image processing apparatus includes a displacement vector generator configured to detect corresponding voxels between reference volume data and target volume data that has been acquired at intervals of a predetermined time period, and to generate a displacement vector between the corresponding voxels; and an intermediate volume data generator configured to generate at least one piece of intermediate volume data between the reference volume data and the target volume data by using the generated displacement vector.

16 Claims, 29 Drawing Sheets

(51) Int. Cl.
  G06K 9/62      (2006.01)
  G06T 7/00      (2017.01)
  G06T 7/20      (2017.01)
  G06T 7/60      (2017.01)
  G06T 7/277     (2017.01)

(52) U.S. Cl.
  CPC .............. *G06T 7/0012* (2013.01); *G06T 7/20* (2013.01); *G06T 7/277* (2017.01); *G06T 7/60* (2013.01); *G06T 2200/04* (2013.01); *G06T 2207/10016* (2013.01); *G06T 2207/10136* (2013.01); *G06T 2207/20072* (2013.01)

(58) Field of Classification Search
  CPC .............. G06T 2207/30004; G06T 7/20; G06T 2211/412; G06T 7/0016; G06T 7/30; G06T 7/33; G06T 2207/10076; G06T 7/269; G06T 7/579; G06T 5/001; G06T 5/50; G06T 7/215; G06T 7/38; G06T 7/149; G06K 9/6202
  See application file for complete search history.

(56) References Cited

U.S. PATENT DOCUMENTS

| | | | | |
|---|---|---|---|---|
| 2004/0021775 | A1* | 2/2004 | Kondo | G06T 7/20 348/207.99 |
| 2011/0081061 | A1  | 4/2011 | Bell et al. | |
| 2012/0321195 | A1* | 12/2012 | Jhunjhunwala | G06T 7/33 382/195 |
| 2014/0071125 | A1* | 3/2014 | Burlina | G06T 7/246 345/420 |
| 2014/0072196 | A1  | 3/2014 | Hwang et al. | |
| 2015/0150535 | A1* | 6/2015 | Fan | A61B 8/485 600/438 |

OTHER PUBLICATIONS

Communication dated Sep. 5, 2016 issued by the European Patent Office in counterpart European Patent Application No. 15193376.9.
Pedro F. Felzenszwalb et al., "Efficient Belief Propagation for Early Vision", Proceedings of the 2004 IEEE Computer Society Conference on Computer Vision and Pattern Recognition (CVPR'04), vol. 1, 2004, (8 Pages Total) XP010708795A, DOI: 10.1109/CVPR.2004.1315041.
Tae-Jin Nam et al., "Optical Flow Based Frame Interpolation of Ultrasound Images", Image Analysis and Recognition Lecture Notes in Computer Science, LNCS 4141, 2006, (12 Pages Total) XP019043756A.
Jan Ehrhardt et al., "Interpolation of Temporal Image Sequences by Optical Flow based Registration", Algorithmen Systeme Anwendungen Proceedings des Workshops vom Mar. 19-21, 2006 in Hamburg, Mar. 2006, pp. 256-260, XP055270917A, Retrieved from the Internet: URL:http://ceur-ws.org/Vol-264/p256.pdf [retrieved on May 6, 2016].
Yair Weiss et al., "On the optimality of solutions of the max-product belief propagation algorithm in arbitrary graphs.", IEEE Transactions on Information Theory, Jan. 2001, (12 Pages Total) XP055270922A, DOI: 10.1109/18.910585 Retrieved from the Internet: URL:http://www.cs.huji.ac.il/yweiss/maxprodieee2.pdf [retrieved on May 4, 2016].
Communication dated May 18, 2016, from the European Patent Office in counterpart European Application No. 15193376.9.

* cited by examiner

IMAGING APPARATUS AND IMAGING METHOD

CROSS-REFERENCE TO RELATED APPLICATION

This application claims priority from Korean Patent Application No. 10-2014-0153923, filed on Nov. 6, 2014 in the Korean Intellectual Property Office, the disclosure of which is incorporated herein by reference in its entirety.

BACKGROUND

1. Field

Exemplary embodiments relate to an imaging apparatus configured to generate a three-dimensional (3D) moving image using a high-speed volume rate, and an imaging method for the same.

2. Description of the Related Art

Medical imaging apparatuses, such as a computed tomography (CT) apparatus, a positron emission tomography (PET) apparatus, a tomosynthesis apparatus, and a magnetic resonance imaging (MRI) apparatus, emit ultrasonic waves or radioactive rays toward an object or apply a magnetic field to the object and thus image the inside of the object non-invasively.

In particular, the above medical imaging apparatus may generate 3D volume data together with 2D sectional images of an object. 3D volume data enable a user to understand morphological characteristics of the inside of the object, and may thus be usefully applied to diagnostics.

SUMMARY

Therefore, it is an aspect of one or more exemplary embodiments to provide an image processing apparatus configured to generate intermediate volume data from a plurality of volume data segments that are obtained as time passes so as to implement high-speed volume data, a medical imaging apparatus including the image processing apparatus, an ultrasonic imaging apparatus, an image processing method, and a medical image generation method.

Additional aspects will be set forth in part in the description which follows and, in part, will be apparent from the description, or may be learned by practice of the exemplary embodiments.

In accordance with an aspect of one or more exemplary embodiments, an image processing apparatus includes: a displacement vector generator configured to detect a first voxel of reference volume data and a corresponding first voxel of target volume data that have been acquired at intervals of a predetermined time period, and to generate a displacement vector that relates to the detected first voxels; and an intermediate volume data generator configured to generate at least one piece of intermediate volume data with respect to the reference volume data and the target volume data by using the generated displacement vector.

The displacement vector generator may be further configured to detect the first voxel of the target volume data by using voxel values of a plurality of contiguous voxels contained in the reference volume data.

The displacement vector generator may be further configured to calculate a cost value using a measurement of a similarity between a voxel of the reference volume data and a voxel of the target volume data, and to use the calculated cost value to detect the first voxel of the target volume data.

The displacement vector generator may be further configured to calculate at least one message value propagated between a plurality of contiguous voxels contained in the reference volume data by using the calculated cost value.

The displacement vector generator may be further configured to calculate a gradient value with respect to the contiguous voxels contained in the reference volume data, and to determine a weight to be applied to the calculated at least one message value based on the calculated gradient value.

The displacement vector generator may be further configured to calculate a belief value that relates to both of a second voxel of the reference volume data and a corresponding second voxel of the target volume data by using the calculated cost value and the calculated at least one message value.

The displacement vector generator may be further configured to generate a first displacement vector that ranges from the reference volume data to the target volume data, and to generate a second displacement vector that ranges from the target volume data to the reference volume data.

The displacement vector generator may be further configured to generate intermediate volume data that is temporally adjacent to the reference volume data by using the first displacement vector, and to generate intermediate volume data that is temporally adjacent to the target volume data by using the second displacement vector.

The displacement vector generator may be further configured to calculate the belief value based on a plurality of voxels contained in a predetermined search range of the target volume data in order to detect the second voxel that corresponds to the second voxel of the reference volume data.

At least one from among the predetermined search range and the predetermined detection range is determined based on at least one movement characteristic of a target object.

The displacement vector generator may be further configured to detect a voxel of target volume data that corresponds to at least one voxel contained in a predetermined detection range of the reference volume data.

The search range or the detection range may be determined based on at least one movement characteristic of a target object.

The search range or the detection range may be gradually increased in size as an amount of movement of the target object becomes greater, and may be gradually reduced in size as the amount of movement of the target object becomes smaller.

The displacement vector generator may be further configured to decimate a reference volume data cost value that is calculated with respect to the reference volume data, and to generate a plurality of pyramid-shaped volume data that have respective cost values as voxel values.

The displacement vector generator may be further configured to calculate a message value from a beginning of highest-level volume data from among the plurality of pyramid-shaped volume data, and to calculate the belief value by using a message value of lowest-level volume data from among the plurality of pyramid-shaped volume data.

The intermediate volume data generator is further configured to generate the intermediate volume data by using a displacement vector to which a weight is applied according to a number and an order of pieces of intermediate volume data to be generated with respect to the reference volume data and the target volume data.

In accordance with another aspect of one or more exemplary embodiments, a medical imaging apparatus includes:

a volume data acquirer configured to acquire reference volume data and target volume data at intervals of a predetermined time period; a displacement vector generator configured to detect a first voxel of the acquired reference volume data and a corresponding first voxel of the acquired target volume data, and to generate a displacement vector that relates to the detected first voxels; and an intermediate volume data generator configured to generate at least one piece of intermediate volume data with respect to the reference volume data and the target volume data by using the displacement vector.

The medical imaging apparatus may further include: a volume renderer configured to render each of the reference volume data, the intermediate volume data, and the target volume data, and to generate a plurality of frame images; and a display device configured to sequentially display the generated frame images according to a time sequence.

In accordance with another aspect of one or more exemplary embodiments, an ultrasonic imaging apparatus includes: an ultrasonic probe configured to repeatedly acquire an ultrasonic image signal at intervals of a predetermined time period in an elevational direction; a volume data generator configured to generate reference volume data and target volume data by using the repeatedly acquired ultrasonic image signal; a displacement vector generator configured to detect a first voxel of the generated reference volume data and a corresponding first voxel of the generated target volume data, and to generate a displacement vector that relates to the detected first voxels; and an intermediate volume data generator configured to generate at least one piece of intermediate volume data with respect to the reference volume data and the target volume data by using the generated displacement vector.

In accordance with another aspect of one or more exemplary embodiments, an image processing method includes: detecting a first voxel of reference volume data and a corresponding first voxel of target volume data that have been acquired at intervals of a predetermined time period; generating a displacement vector that relates to the detected first voxels; and generating at least one piece of intermediate volume data with respect to the reference volume data and the target volume data by using the generated displacement vector.

The reference volume data and the target volume data are acquired from a medical image.

The medical image is an ultrasonic image.

The calculating the belief value includes: calculating a gradient value with respect to the contiguous voxels contained in the reference volume data; and determining a weight to be applied to the calculated at least one message value based on the calculated gradient value.

The generating the displacement vector includes: generating a first displacement vector that ranges from the reference volume data to the target volume data and a second displacement vector that ranges from the target volume data to the reference volume data.

The generating the intermediate volume data includes: generating intermediate volume data that is temporally adjacent to the reference volume data by using the first displacement vector; and generating intermediate volume data that is temporally adjacent to the target volume data by using the second displacement vector.

The detecting the first voxels includes: calculating the belief value based on a plurality of voxels contained in a predetermined search range of the target volume data in order to detect the second voxel that corresponds to the second voxel of the reference volume data.

The detecting the first voxels includes: detecting a voxel of target volume data that corresponds to at least one voxel contained in a detection range of the reference volume data.

In accordance with another aspect of one or more exemplary embodiments, an image processing method includes: acquiring, with respect to a moving object, a first set of volume data at a first time and a second set of volume data at a second time that is later than the first time, each of the first and at least second sets of volume data including respective sets of voxels; selecting a reference voxel from among the first set of volume data; determining, from among the second set of volume data, a voxel that corresponds to the selected reference voxel as a target voxel; and generating an intermediate voxel that corresponds to a third time based on the selected reference voxel and the determined target voxel, the third time being later than the first time and earlier than the second time.

The generating an intermediate voxel includes assigning a first weight to the selected reference voxel and assigning a second weight to the determined target voxel, and wherein a value of the first weight is based on a time difference between the first time and the third time, and a value of the second weight is based on a time difference between the third time and the second time.

The determining of a voxel as a target voxel includes measuring a degree of similarity between a voxel from among the first set of volume data and a voxel from among the second set of volume data, and determining the voxel as the target voxel based on the measured degree of similarity.

The determining of a voxel as a target voxel includes determining a gradient with respect to contiguous voxels included in the first set of volume data, and determining the voxel as the target voxel based on the determined gradient.

In accordance with another aspect of one or more exemplary embodiments, a medical image forming method includes: acquiring reference volume data and target volume data at intervals of a predetermined time period; detecting a first voxel of the reference volume data and a corresponding first voxel of the target volume data; generating a displacement vector that relates to the detected first voxels; and generating at least one piece of intermediate volume data with respect to the reference volume data and the target volume data by using the generated displacement vector.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
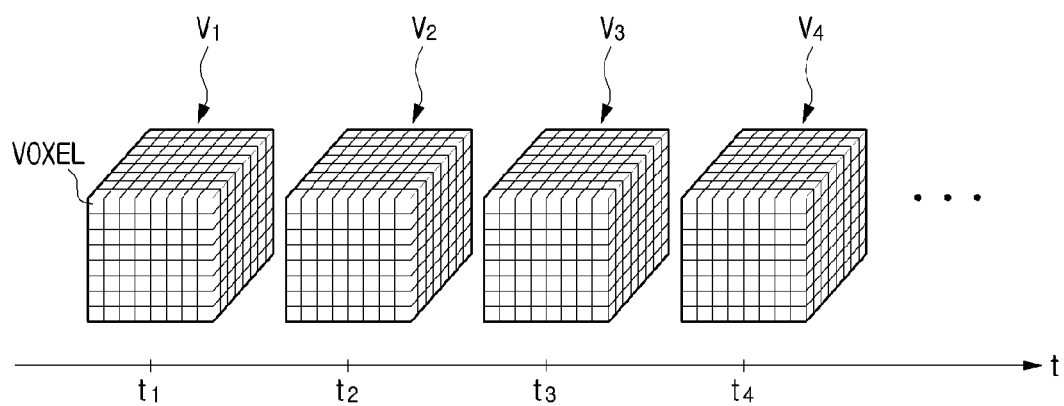
FIG. 1 is a conceptual diagram illustrating volume data input to an image processing apparatus, according to an exemplary embodiment.

Reference will now be made in detail to exemplary embodiments, examples of which are illustrated in the accompanying drawings, wherein like reference numerals refer to like elements throughout.

FIG. 1 is a conceptual diagram illustrating volume data input to an image processing apparatus, according to an exemplary embodiment.

Volume data for imaging a three-dimensional (3D) volume of an object can be obtained from various imaging fields, such as medical imaging fields or the like. For example, a plurality of cross-sectional images may be obtained along a longitudinal-axis direction of the object, the obtained cross-sectional images may be interpolated to reconstruct a volume of the object, the reconstructed volume of the object may be represented by volume data, and the volume data may include a plurality of voxels that are three-dimensionally arranged, as shown in FIG. 1.

Referring to FIG. 1, a plurality of volume data ($V_1$, $V_2$, $V_3$, $V_4$ . . . ) may be obtained as time passes, and there is a time difference among acquisition times ($t_1$, $t_2$, $t_3$, $t_4$) that correspond to the respective volume data. A large time difference or a small time difference may be present among a plurality of volume-data acquisition times according to performance of a device configured to acquire volume data. If a time difference becomes larger, it may be difficult to represent the natural movement of the object when the obtained volume data segments are rendered and successively displayed.

The image processing apparatus, according to the exemplary embodiment, implements a high-speed volume rate by generating at least one piece of intermediate volume data between input volume data segments, so that the natural movement of the object can be represented.

Figure 2:
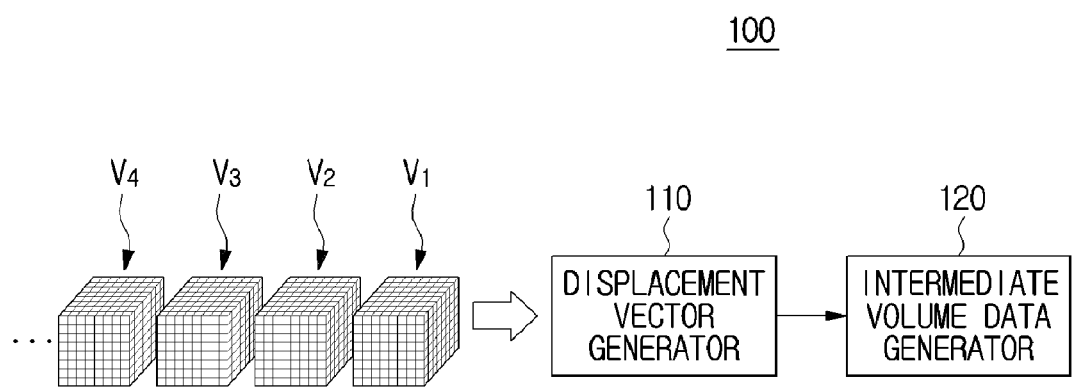
FIG. 2 is a control block diagram illustrating an image processing apparatus, according to an exemplary embodiment.
Figure 3:
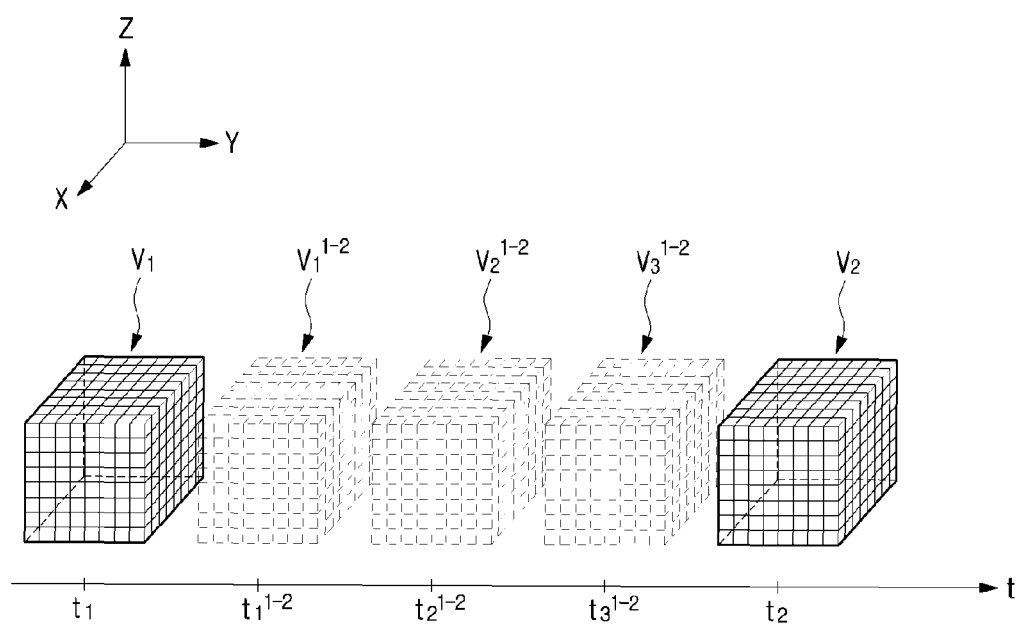
FIG. 3 is a conceptual diagram illustrating intermediate volume data generated by the image processing apparatus, according to an exemplary embodiment.

FIG. 2 is a control block diagram illustrating an image processing apparatus, according to an exemplary embodiment. FIG. 3 is a conceptual diagram illustrating intermediate volume data generated by the image processing apparatus, according to an exemplary embodiment.

Referring to FIG. 2, the image processing apparatus 100 according to the exemplary embodiment may include a displacement vector generator 110 configured to generate a displacement vector by using a plurality of input volume data ($V_1$, $V_2$, $V_3$, $V_4$ . . . ), and an intermediate volume data generator 120 configured to generate intermediate volume data by using the input volume data and the displacement vector.

The displacement vector generator 110 may obtain the intermediate volume data by using one pair of two volume data successively obtained from among the plurality of input volume data. One pair of volume data may include two pieces of volume data located at the front and rear locations on a time axis. For example, as shown in FIG. 3, the displacement vector may be generated by using two volume data ($V_1$, $V_2$) from among input volume data, and the intermediate volume data generator 120 may generate the intermediate volume data ($V_1^{1\text{-}2}$, $V_2^{1\text{-}2}$, $V_3^{1\text{-}2}$) between two volume data ($V_1$, $V_2$) by using the generated displacement vector.

In more detail, the displacement vector may indicate a displacement from first volume data ($V_1$) to the second volume data ($V_2$) or a displacement from the second volume data ($V_2$) to the first volume data ($V_1$). The displacement, which is weighted according to the number (e.g., 3 in the example of FIG. 3) of intermediate volume data to be generated, is applied to the first volume data ($V_1$) or the second volume data ($V_2$), so that a plurality of intermediate volume data can be generated. In this case, the first volume data and the second volume data may be used to indicate the order of data acquisition, and there is no limitation with respect to information that indicates whether other volume data is acquired before acquisition of the first volume data or after acquisition of the second volume data. It may be assumed that the generated intermediate volume data ($V_1^{1\text{-}2}$, $V_2^{1\text{-}2}$, $V_3^{1\text{-}2}$) have been respectively acquired at different time points ($t_1^{1\text{-}2}$, $t_2^{1\text{-}2}$, $t_3^{1\text{-}2}$) that occur between two time points ($t_1$, $t_2$). Thus, although volume data is actually obtained at a low-speed volume data, the same result as in the case in which volume data is obtained at a high-speed volume data can be obtained.

Meanwhile, the displacement vector generator 110 and the intermediate volume data generator 120 for use in the image processing apparatus 100 may be implemented by a processor, such as, for example, a Central Processing Unit (CPU) or a Graphics Processing Unit (GPU). Each of the displacement vector generator 110 and the intermediate volume data generator 120 may be implemented by an independent processor, or both thereof may also be implemented by one processor. In particular, constituent elements of the image processing apparatus 100 are not classified according to whether they are physically separated from each other, and are classified according to their execution operations, so that there is no limitation with respect to specific information that indicates whether the processor is independently used.

The operation for generating the displacement vector by using the displacement vector generator 110 will hereinafter be described in detail.

The displacement vector may indicate information that relates to a motion between the first volume data and the second volume data. The displacement vector generator 110 may detect the corresponding point between the first volume data and the second volume data so as to generate this displacement vector. In more detail, it may be determined where a certain voxel contained in the first volume data is located in the second volume data after a lapse of a predetermined time $\Delta t$ $(=t_2-t_1)$, or it may be determined where a certain voxel contained in the second volume data is located in the first volume data before reaching the predetermined time $\Delta t$ $(=t_2-t_1)$. As described below, the displacement vector generator 110 may detect a voxel of the second volume data or a voxel of the first volume data in association with all voxels of the first volume data or all voxels of the second volume data, or may detect the voxel of the second volume data or the first volume data only in some regions. In all cases, since the displacement vector generator 110 detects the corresponding point on a voxel basis, it may be possible to generate the displacement vector which is capable of correctly indicating the motion of an object.

Various algorithms may be applied to the displacement vector generator 110 so that the displacement vector generator 110 can detect the corresponding point between two volume data obtained at intervals of a time period. For example, the belief propagation algorithm may be used to detect the corresponding point in consideration of not only one voxel to be used for detection of the corresponding point, but also voxels adjacent to the voxel. The operation of the displacement vector generator 110 will hereinafter be described using the belief propagation algorithm.

Figure 4:
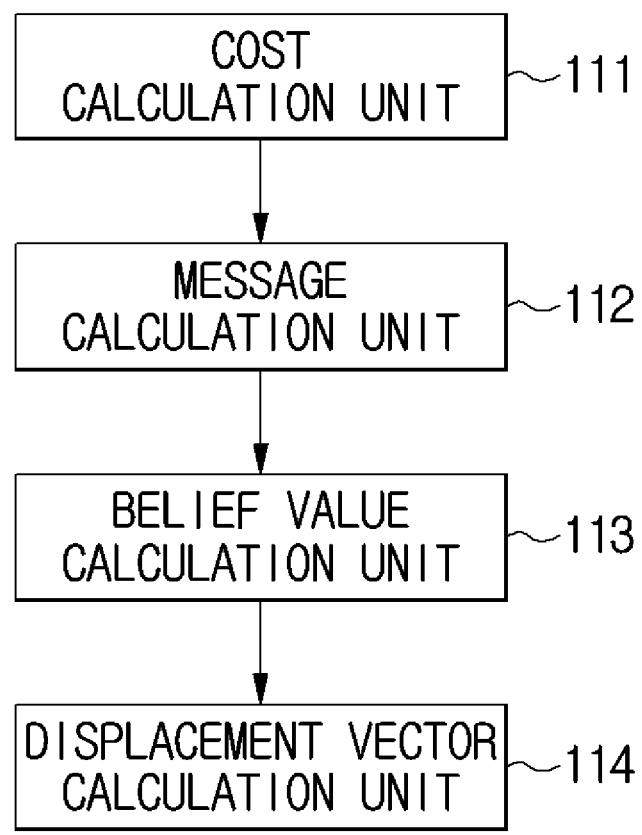
FIG. 4 is a control block diagram illustrating individual constituent elements of a displacement vector generator.

FIG. 4 is a control block diagram illustrating individual constituent elements of a displacement vector generator.

As described above, in the case in which the displacement vector generator 110 detects the corresponding point between two volume data on the basis of the belief propagation algorithm, the displacement vector generator 110 may include a cost calculation unit (also referred to herein as a "cost calculator") 111 configured to calculate a cost value that relates to the first volume data and the second volume data; a message calculation unit (also referred to herein as a "message calculator") 112 configured to propagate a message value to a contiguous voxel in association with the calculated cost value; a belief value calculation unit (also referred to herein as a "belief value calculator") 113 configured to calculate a belief value by using the cost value and the message value; and a displacement vector generator 114 configured to determine a voxel that has a minimum belief value to be the corresponding point and to calculate a displacement vector based on the determined voxel.

Prior to detection of the corresponding point between two volume data, reference data and target data may be established. In this case, the reference data and the target data may be used to determine the direction of a displacement vector. Basically, the displacement vector may indicate the movement amount and the movement direction from the reference volume data to the target volume data. However, when calculating a bidirectional displacement vector to be described, it may be possible to calculate the displacement vector from the target volume data to the reference volume data. The acquired volume data may be used as the reference volume data or the target volume data. In accordance with the exemplary embodiment, there is no limitation with respect to the information that indicates which one of the first-acquired volume data and the next-acquired volume data will be used as a reference.

The cost calculation unit 111 may calculate a cost value by performing a similarity measurement with respect to the reference volume data and the target volume data. The cost value may be calculated on a voxel basis, and calculation of the cost value calculation of the message value to be described, and calculation of the belief value may be performed on a voxel basis.

A cost function may be used to calculate the cost value. The cost function may be classified into a minimum cost value for searching for a difference value between two voxel values and a maximum cost value for searching for the normalized association between two voxel values according to cost function categories. The calculation result value of the minimum cost function may indicate the error and/or a cost. As the calculation result value decreases, the probability of occurrence of the corresponding position increases. As the calculation value of the maximum cost function increases, the probability of the occurrence of the corresponding point increases. As examples of the minimum cost function, any of Sum of Squared Difference (SSD), Sum of Absolute Difference (SAD), Mean of Absolute Difference (MAD), etc. may be used. As examples of the maximum cost function, any of Normalized Sum of Squared Difference (NSSD), Normalized Correlation (NC), Normalized Cross Correlation (NCC), etc. may be used.

The image processing apparatus 100 has no limitation with respect to categories of cost functions to be used. Of course, other cost functions as well as the above exemplary cost functions may also be used. However, the following exemplary embodiment assumes use of a minimum cost function.

For example, the cost calculation unit 111 may calculate the cost value according to the following Equation 1.

$$C(i,j,k)=|V_{tgt}(i',j',k')-V_{ref}(i,j,k)|. \quad \text{[Equation 1]}$$

In Equation 1, $C(i, j, k)$ may indicate a cost value of a voxel located at coordinates $(i, j, k)$ of a 3D space composed of an X-axis, a Y-axis, and a Z-axis, from among voxels constructing the reference volume data, $V_{tgt}(i', j', k')$ may indicate a value of a voxel located at coordinates $(i', j', k')$ from among voxels constructing the target volume data, and $V_{ref}(i, j, k)$ may indicate a value of a voxel located at coordinates $(i, j, k)$ from among voxels constructing the reference volume data. In this aspect, i, j, or k is an integer of 1 or greater, and may have the same values as i', j', or k' or may have different values from i', j', or k'. For convenience of description and better understanding of the exemplary embodiment, a voxel contained in the reference volume data will hereinafter be referred to as a reference voxel, and a voxel contained in the target volume data will hereinafter be referred to as a target voxel.

The message calculation unit 112 may propagate a message value to contiguous voxels related to the calculated cost value, so that the message calculation unit 112 may consider not only a voxel value $V_{ref}(i, j, k)$ of the reference voxel to be used as the corresponding point detection target, but also voxel values of voxels adjacent to the reference voxel.

Figure 5:
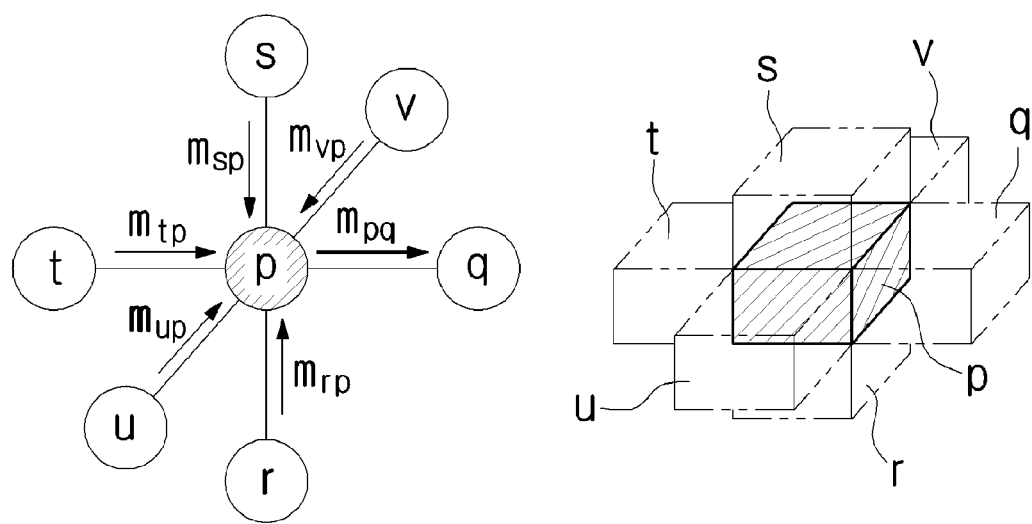
FIG. 5 is a conceptual diagram illustrating a method for propagating a message value by using a message calculation unit.
Figure 6:
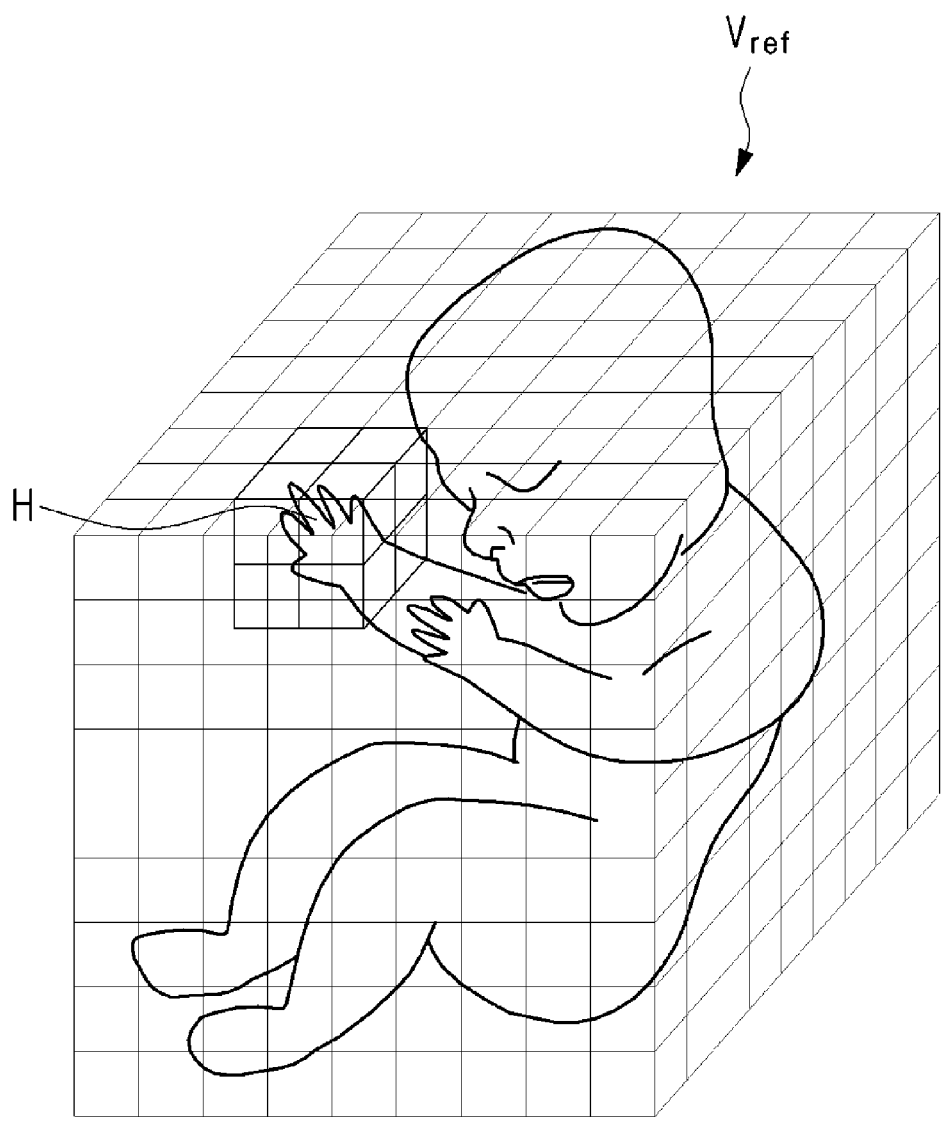
FIG. 6 is a conceptual diagram illustrating the effect obtained when contiguous voxel values are considered.
Figure 7:
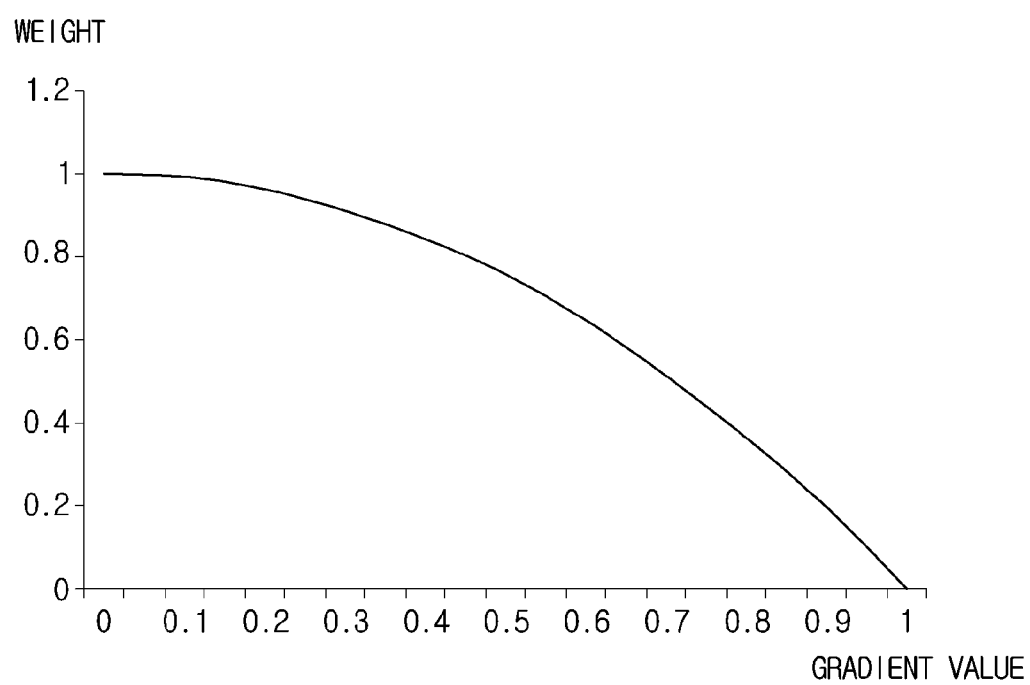
FIG. 7 is a graph illustrating the magnitude of weights applied to message values.
Figure 8:
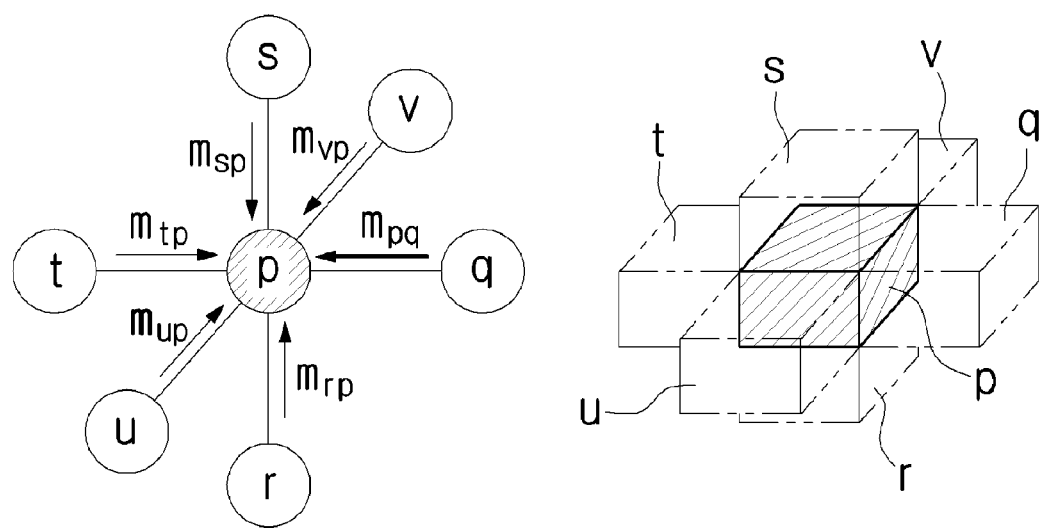
FIG. 8 is a conceptual diagram illustrating a method for propagating a message value in order to calculate a belief value.

FIG. 5 is a conceptual diagram illustrating a method for propagating a message value by using a message calculation unit. FIG. 6 is a conceptual diagram illustrating the effect obtained when contiguous voxel values are considered. FIG. 7 is a graph illustrating the magnitude of weights applied to message values. FIG. 8 is a conceptual diagram illustrating a method for propagating a message value in order to calculate a belief value.

When volume data is modeled by a Markov random field, respective voxels that constitute the volume data may be represented by nodes, respectively. As can be seen from FIG. 5, assuming that one reference voxel is denoted by 'p', voxels located at the left and right positions of the reference voxel corresponding to the node 'p' may be represented by a node (t) and a node (q), respectively. Voxels located at the front and rear positions of the reference voxel may be represented by a node (u) and a node (v), respectively. Voxels located at the upper and lower positions of the reference voxel may be represented by a node (s) and a node (r), respectively.

For example, a message value sent from the node (p) to the node (q) may be represented by the following Equation 2.

$$m_{pq}(x_q) = \min_{x_p} \left\{ V_{pq}(x_p, x_q) + C_p(x_p) + \sum_{n(\neq q)} m_{np}(x_p) \right\}$$ [Equation 2]

In Equation 2, $V_{pq}(x_p, x_q)$ may denote continuous terms disposed between the node (p) and the node (q), as expressed by the following Equation 3.

$$V_{pq}(x_p, x_q) = \min(s\|x_p - x_q\|, d).$$ [Equation 3]

In Equation 3, $x_p$ may denote a voxel value at the node (p), $x_q$ may denote a voxel value at the node (q), s may denote a weight to be applied to an absolute value related to a difference in voxel value between the node (p) and the node (q), and d may denote a threshold value for determining a contiguous term. $C_p(x_p)$ may denote a cost value at the node (p), and $m_{np}(x_p)$ may denote a message value sent from the node (n) (where n is a variable) to the node (p) (where, n∈{r, s, t, u, v}).

Referring to Equation 2 and FIG. 5, in order to calculate a message value from the node (p) to the node (q), a message value $m_{rp}(x_p)$, $m_{sp}(x_p)$, $m_{tp}(x_p)$, $m_{up}(x_p)$, or $m_{vp}(x_p)$ respectively sent from the node (r), the node (s), the node (t), the node (u), or the node (v) to the node (p) may be calculated, so that a message value may be propagated among the contiguous voxels. For example, if a reference voxel is being used to attempt to detect the corresponding target voxel, and the reference voxel is contained in a hand of a fetus as shown in FIG. 6, it may be estimated that the reference voxels adjacent to the corresponding reference voxel may have similar voxel values. Therefore, assuming that the target voxel has a voxel value identical to that of a reference voxel to be used as the corresponding point detection target or has a voxel value similar to those of other reference voxels adjacent to the above reference voxel, there is a higher probability that the target voxel is used as the corresponding point of the corresponding reference voxel. Therefore, the detection accuracy of the corresponding point may be increased via propagation of the message value.

However, if the reference voxel is located at an edge of the hand, it may be less likely that voxels adjacent to the corresponding reference voxel have similar voxel values. Therefore, the belief value calculation unit 113 may calculate a gradient value at each node based on a texture analysis, and may apply an appropriate weight to the message value according to the calculated gradient value. As shown in FIG. 7, if the gradient value is relatively high, it can be estimated that the corresponding region is an edge region, so that a low weight may be applied. If the gradient value is relatively low, it can be estimated that the corresponding region is a relatively uniform region, so that a high weight may be applied. If different weights are applied to the message value according to the gradient value between the nodes, a weight of the message value for use in the edge region and a weight of the message value for use in the relatively uniform region are varied, so that accuracy of the belief value to be calculated in a subsequent process is improved. However, although the above operation for applying the weight to the message value has been used to increase the accuracy of the corresponding point detection for convenience of description, it should be noted that the weight is not always applied to the message value of the image processing apparatus.

The belief value calculation unit 113 may calculate a belief value with respect to the reference voxel and the target voxel by using the calculated cost value, the message value, and/or the weighted message value. For example, assuming that the reference voxel to be used as the corresponding point detection target corresponds to the node (p), all message values sent from other contiguous nodes in the vicinity of the node (p) to the node (p) are summed as shown in FIG. 8. Therefore, the belief value at the node (p) may be calculated by applying the following Equation 4.

$$b_p = C_p(x_p) + \sum_{n \in \epsilon} m_{np}(x_p)$$ [Equation 4]

In Equation 4, $b_p$ denotes a belief value at the node (p), and $\epsilon=\{q, r, s, t, u, v\}$ denotes the position of contiguous nodes. $C_p(x_p)$ denotes the cost value of the node (p), and $m_{np}(x_p)$ denotes the message value sent from the node (n) to the node (p). In this case, the message value may be a message value to which the weight is applied, or may be a message value to which no weight is applied, as described above. Further, if the maximum cost function is applied to the process for calculating the cost value at the node (p), the calculated cost value is inverted so that the inverted result may be applied to the process for calculating the belief value.

Figure 9:
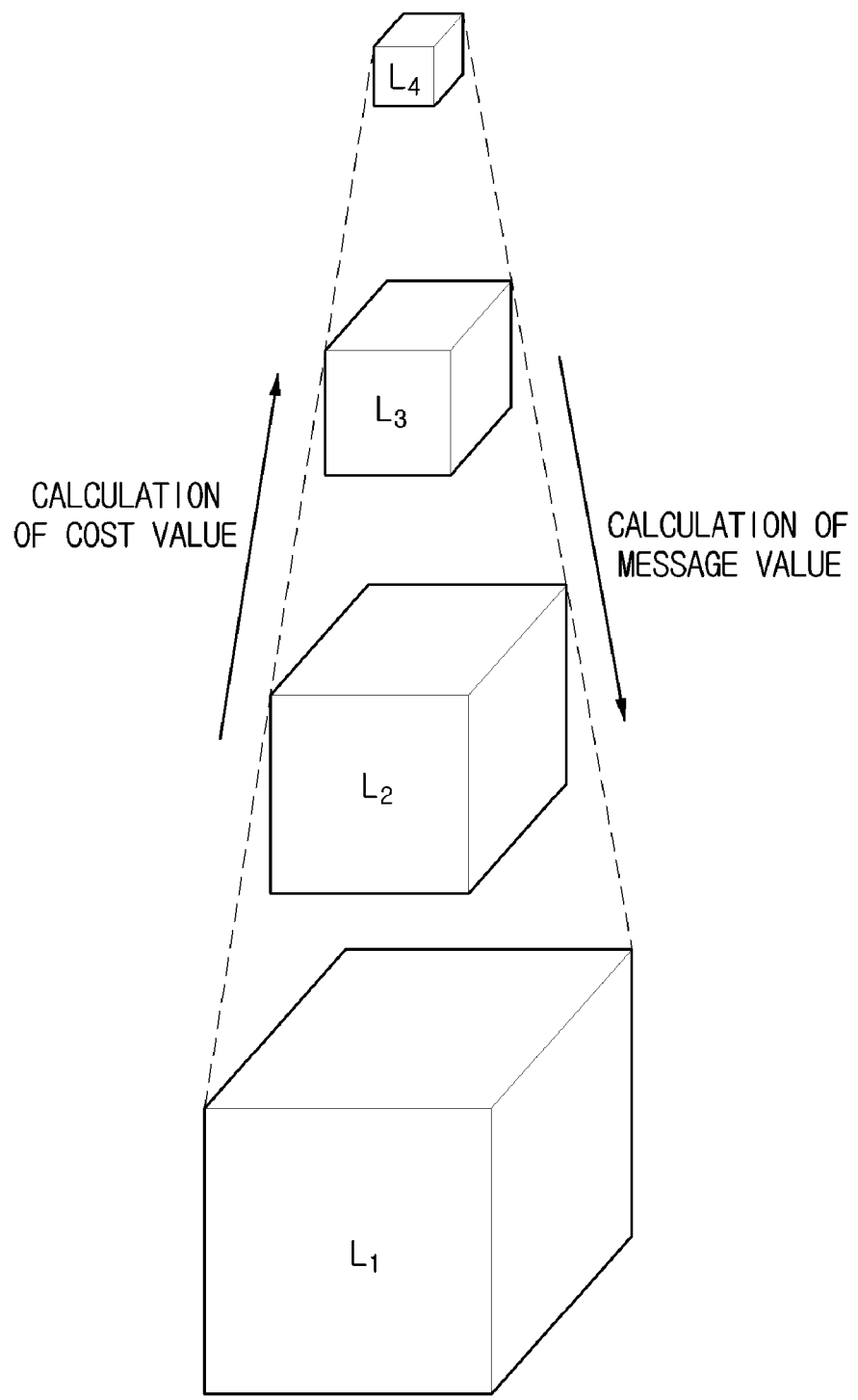
FIG. 9 is a conceptual diagram illustrating a method for calculating a belief value by using a pyramid image structure.

FIG. 9 is a conceptual diagram illustrating a method for calculating a belief value by using a pyramid image structure.

In accordance with one example, when the belief value calculation unit 113 calculates the belief value, a coarse-to-fine pyramid image based belief value propagation algorithm may be used. The cost value calculated from original volume data is decimated so that a pyramid image having the cost value instead of the voxel value is formed in a stepwise manner. In the above-mentioned example, four pyramid images being reduced stepwise are formed. When the message value is calculated by using the cost value from the highest level (L4), the message value of the lowest level (L1) may be used to calculate the final belief value. In the case of calculating the belief value by using the coarse-to-fine pyramid image structure, it may be possible to stably calculate the corresponding point position in association with the errors encountered by noise or the like.

The displacement vector calculation unit 114 may detect the target voxel that corresponds to the reference voxel by using the calculated belief value. In particular, the voxel having the smallest belief value from among the calculated belief values may be determined to be the target voxel, and as such a detailed description thereof will hereinafter be given.

Figure 10:
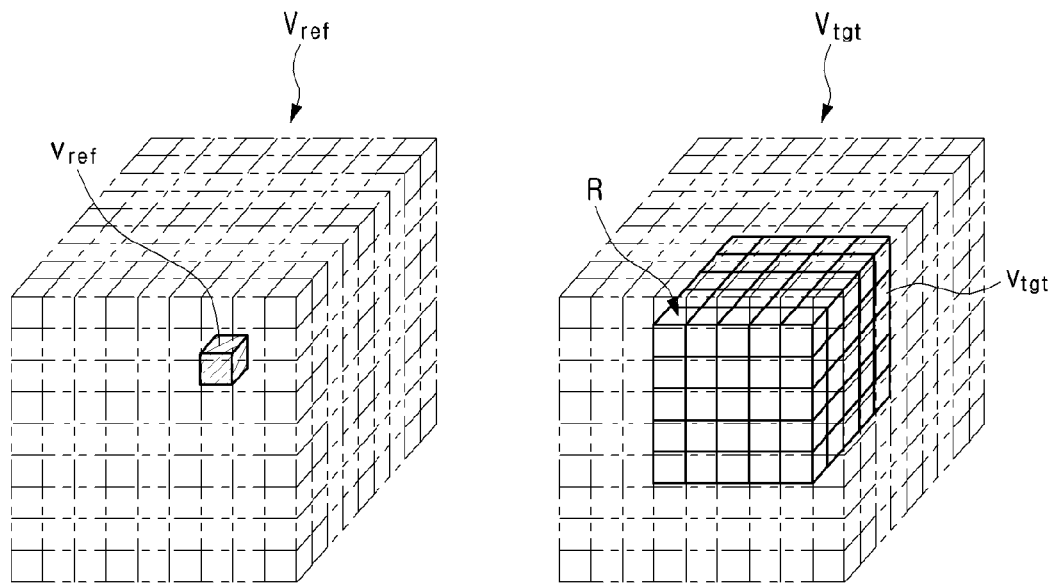
FIG. 10 is a conceptual diagram illustrating a search range to be used as a candidate of a corresponding point of a reference voxel for use with respect to target volume data.
Figure 11:
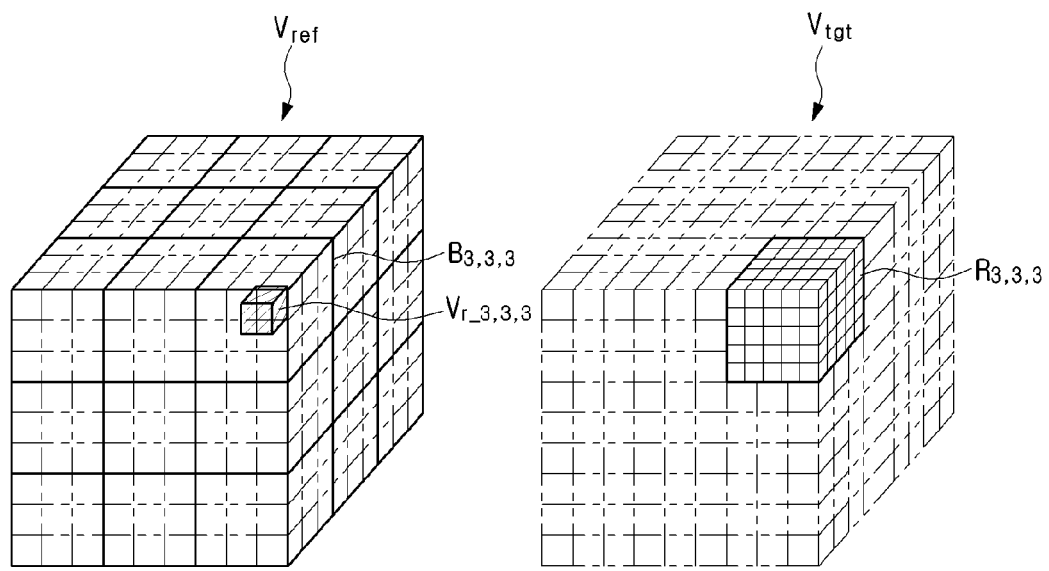
FIG. 11 is a conceptual diagram illustrating a range of a reference voxel to be used as a corresponding point detection target with respect to reference volume data.
Figure 12:
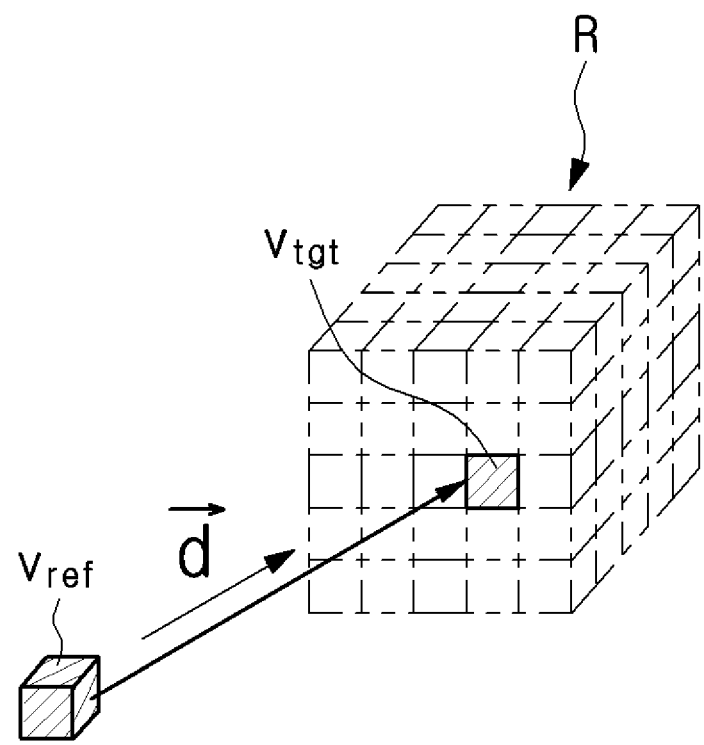
FIG. 12 is a conceptual diagram illustrating a displacement vector between a reference voxel and the corresponding point.

FIG. 10 is a conceptual diagram illustrating a search range to be used as a candidate of a corresponding point of a reference voxel for use with respect to target volume data. FIG. 11 is a conceptual diagram illustrating a range of a reference voxel to be used as a corresponding point detection target with respect to reference volume data. FIG. 12 is a conceptual diagram illustrating a displacement vector between a reference voxel and the corresponding point.

Referring to the above-mentioned process for detecting the corresponding point, the belief value between one reference voxel ($V_{ref}$) contained in the reference volume data ($V_{ref}$) and one target voxel ($V_{tgt}$) contained in the target volume data ($V_{tgt}$) can be calculated. In this case, the process for calculating the belief value is applied to one reference voxel and a plurality of target voxels, and the target voxel having the lowest belief value as calculated with respect to the reference voxel may be detected as the corresponding point of the reference voxel.

Although the belief values associated with all target voxels can be calculated, it may also possible to calculate the belief value associated with only the target voxel ($V_{tgt}$) contained in a predetermined search range (R) contained in the target volume data ($V_{tgt}$) so as to reduce the number of calculations, as shown in FIG. 10. In this case, the search range (R) may be established to have a predetermined size on the basis of the location having the same coordinates as those of the reference voxel ($V_{ref}$) that indicates the corresponding point detection target. For example, the search range (R) size may be established on the basis of one or more movement characteristics of the object. If the movement characteristics of the target object indicate a relatively large amount of movement, a large search range (R) may be established. If the movement characteristics of the target object indicate a relatively small amount of movement, a small search range (R) may be established. In addition, the search range (R) of the target volume data ($V_{tgt}$) may be established in different ways according to the reference voxel, or may be equally established. For example, if a reference voxel that indicates the corresponding point detection target object is located in the region in which relatively large movement characteristics of the target object are generated, a large search space (R) may be established. If the reference voxel is located in the other region in which relatively small movement characteristics of the target object are generated, a small search space (R) may be established.

If the reference volume data ($V_{ref}$) is composed of N reference voxels (where N is an integer of 1 or greater) and the search range (R) of the target volume data ($V_{tgt}$) is composed of m target voxels (where m is an integer of 1 or greater), the number of the corresponding point candidate target voxels for use with respect to the single reference voxel is set to m. Therefore, the belief value calculation unit 113 may calculate m belief values in order to search for the corresponding point of the single reference voxel, and the target voxel for which the lowest belief value is calculated from among the m belief values may be set to the corresponding point of the corresponding reference voxel. In association with all the reference voxels contained in the reference volume data, points that correspond to all the reference voxels are detected. If all the reference voxels have the same-sized search range, a total number of (N×m) belief values can be calculated. As shown in FIG. 11, it may also be possible to detect the corresponding point only for some reference voxels of the reference volume data ($V_{ref}$) so as to reduce the number of calculations. For example, the reference volume data may be divided into a plurality of blocks, and it may also be possible to detect the corresponding point only for a single respective reference voxel that represents each block. As can be seen from FIG. 11, the reference volume data ($V_{ref}$) is divided into (3×3×3) blocks, a representative reference voxel is selected from each respective block, and the corresponding point corresponding to the selected representative reference voxel is detected from the search range (R) of the target volume data. In addition, the search range (R) of the target volume data ($V_{tgt}$) may be established in the same manner as in the blocks of the reference volume data ($V_{ref}$). For example, the corresponding point of the representative reference voxel ($v_{r\_3,3,3}$) with respect to the block ($B_{3,3,3}$) located at the (3, 3, 3) position may be detected in the search range ($R_{3,3,3}$) of the target volume data ($V_{tgt}$), and the corresponding point of the reference voxel with respect to the remaining blocks other than the block ($B_{3,3,3}$) may also be detected in the search range (R) corresponding to the target volume data ($V_{tgt}$).

From among the reference volume data ($V_{ref}$), the number (which corresponds to the magnitude of the detection range) of reference voxels to be used as the corresponding point detection target or the block size of reference volume data ($V_{ref}$) may be established on the basis of characteristics of the target object. If the target object has movement characteristics that indicate a relatively large amount of movement, a large number of reference voxels may be established or a small block size may be established. If the target object has movement characteristics that indicate a relatively small amount of movement, a small number of reference voxels may be established or a large block size may be established.

In addition, individual regions may also have different block sizes or different numbers of reference voxels to be used as the corresponding point detection targets. For example, assuming that the target object is a fetus and input volume data is ultrasonic image data, it is estimated that a region that corresponds to a head or torso of the fetus has a relatively small amount of movement, so that a large block size may be established or a small number of reference voxels to be used as the corresponding point detection targets may be established. Conversely, it is estimated that a region that corresponds to the hand or foot of the fetus has a relatively large amount of movement, so that a small block size may be established or a large number of reference voxels to be used as the corresponding point detection targets may be established.

However, aside from the above-mentioned examples, the number of reference voxels to be used as the corresponding point detection targets or the block size may be established according to various criteria.

As shown in FIG. 12, the displacement vector calculation unit 114 may calculate a displacement vector ($\vec{d}$) between the reference voxel ($V_{ref}$) and the target voxel ($V_{tgt}$) indicating the corresponding point of the reference voxel ($V_{ref}$). The displacement vector ($\vec{d}$) may indicate the movement amount and the movement direction from the reference voxel ($V_{ref}$) to the target voxel ($V_{tgt}$), and may be denoted by $\vec{d}=(d_x^{(1,2)}, d_y^{(1,2)}, d_z^{(1,2)})$. The displacement vector ($\vec{d}$) may be applied to the case in which the reference volume data is first volume data and the target volume data is second volume data.

If the displacement vector is calculated, the intermediate volume data generator 120 may generate the intermediate volume data by using the calculated displacement vector. A weight ($\alpha$) is multiplied by the displacement vector component of the x-axis, y-axis, or z-axis (where $0<\alpha<1$). In this aspect, the value of $\alpha$ may vary according to the number of intermediate volume data segments to be generated.

In more detail, the intermediate volume data generator 120 may generate the intermediate volume data according to the following Equations 5 and 6.

$$V_1(x, y, z) = V_w^{1-2}(x + \alpha \cdot d_x^{(1,2)}, y + \alpha \cdot d_y^{(1,2)}, z + \alpha \cdot d_z^{(1,2)}) \quad \text{[Equation 5]}$$

$$\alpha = \frac{w}{W+1} \quad \text{[Equation 6]}$$

In Equation 6, w is an index that indicates the order of intermediate volume data to be generated, and W is a total number of intermediate volume data to be generated.

Figure 13:
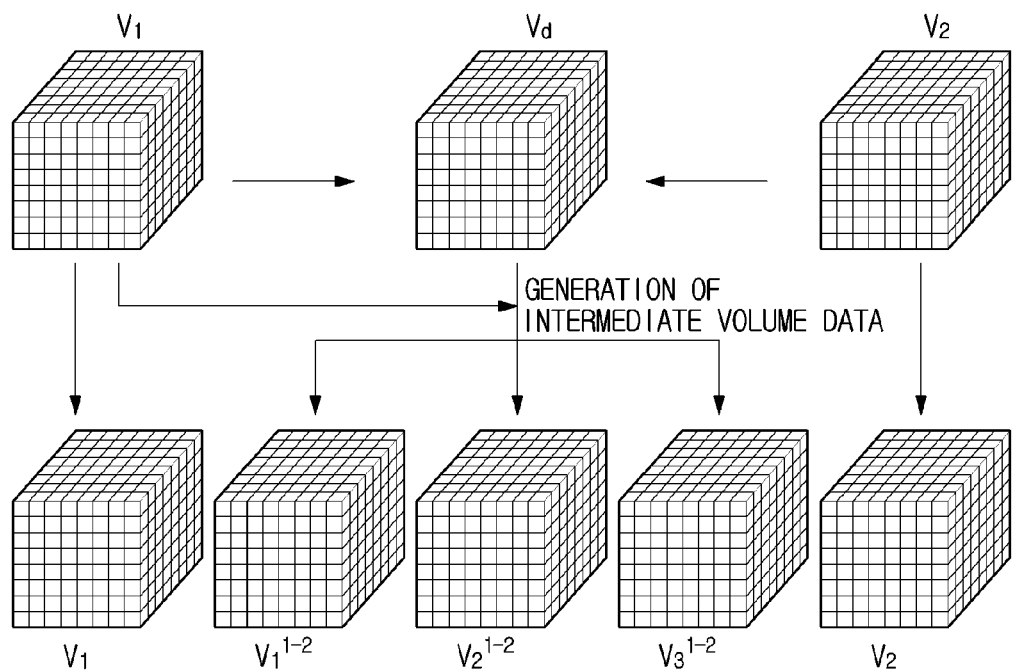
FIGS. 13 and 14 are conceptual diagrams illustrating a method for generating the intermediate volume data.
Figure 14:
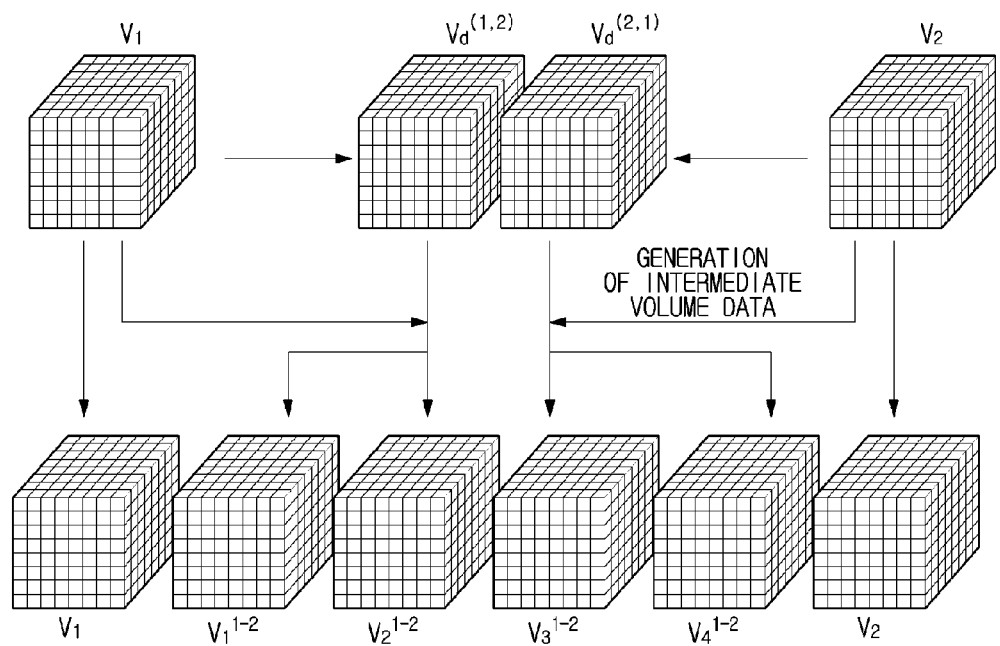

FIGS. 13 and 14 are conceptual diagrams illustrating a method for generating the intermediate volume data.

For example, in the case of generating three intermediate volume data segments (W=3), the weight $\alpha$ may be set to ¼, 2/4, or ¾ according to the order of intermediate volume data, and the intermediate volume data acquired at a specific time located relatively close to the acquisition time of the first volume data has a relatively low order.

Referring to FIG. 13, the displacement vector generated using the first volume data and the second volume data may be denoted by a volume displacement ($V_d$), and the intermediate volume data may be generated using the displacement vector $\vec{d}^{(1, 2)}$ to which the first volume data and the weight ($\alpha$) are applied according to Equation 5. In this case, the weight ¼ may be applied to the first volume data ($V_1^{1-2}$) between the first volume data and the second volume data, the weight 2/4 may be applied to the second volume data ($V_2^{1-2}$), and the weight ¾ may be applied to the third volume data ($V_3^{1-2}$).

Alternatively, it may also be possible to generate the intermediate volume data by using the bidirectional displacement vector. In this case, the displacement vector generator 110 can generate the displacement vector in two ways, and may generate two displacement vectors by changing the direction of the displacement vector. In more detail, the displacement vector generator 110 may generate the displacement vector $\vec{d}^{(1, 2)}$ from the first volume data to the second volume data, and may generate the displacement vector $\vec{d}^{(1, 2)}$ from the second volume data to the first volume data.

In the case of generating the intermediate volume data by using the bidirectional displacement vector, the following Equation 7 may be used.

$$V_1(x,y,z) = V_w^{1-2}(x + \alpha \cdot d_x^{(1,2)}, y + \alpha \cdot d_y^{(1,2)}, z + \alpha \cdot d_z^{(1,2)}),$$
$$w \leq W/2$$

$$V_2(x,y,z) = V_w^{2-1}(x + \alpha \cdot d_x^{(2,1)}, y + \alpha \cdot d_y^{(2,1)}, z + \alpha \cdot d_z^{(2,1)}),$$
$$w > W/2 \quad \text{[Equation 7]}$$

Further, if a total number (W) of intermediate volume data segments is an odd number, the positions of an inequality sign and equal sign shown in Equation 7 may be changed as necessary. In particular, the index range to which the displacement vector $\vec{d}^{(1, 2)}$ is applied may be denoted by $w<W/2$, and the index range to which the displacement vector $\vec{d}^{(2, 1)}$ is applied may be denoted by $w \geq W/2$.

As exemplarily expressed in Equation 7, intermediate volume data is generated using the input volume data that is temporally close to the intermediate volume data to be generated.

As shown in FIG. 14, the displacement vector $\vec{d}^{(1, 2)}$ may be denoted by the volume displacement $V_d^{(1,2)}$, and the displacement vector $\vec{d}^{(2, 1)}$ may be denoted by the volume displacement $V_d^{(2, 1)}$. In the case of generating four intermediate volume data segments (w=4), the intermediate volume data ($V_1^{1-2}$) having an index (w=1) may be generated by using the displacement vector $\vec{d}^{(1, 2)}$ to which the first volume data ($V_1$) and the weight (⅕) are applied, and the intermediate volume data ($V_2^{1-2}$) having an index (w=2) may be generated by using the displacement vector $\vec{d}^{(1, 2)}$ to which the first volume data ($V_1$) and the weight ⅖ are applied. The intermediate volume data ($V_3^{1-2}$) having an index (w=3) may be generated by using the displacement vector $\vec{d}^{(2, 1)}$ to which the second volume data ($V_2$) and the weight ⅗ are applied. The intermediate volume data ($V_4^{1-2}$) having an index (w=4) may be generated by using the displacement vector $\vec{d}^{(2, 1)}$ to which the second volume data ($V_2$) and the weight ⅘ are applied.

Calculation of Equation 5 or Equation 7 may be performed on all voxels that constitute the intermediate volume data. In the case of calculating the displacement vector with respect to all reference voxels that constitute the reference volume data, the voxel values of all voxels that constitute the intermediate volume data can be calculated by applying Equation 5 or Equation 7 to all reference voxels. In the case of calculating only some reference voxels from among reference voxels constructing the reference volume data, Equation 5 or Equation 7 may also be applied to the remaining reference voxels by using the relationship between the reference voxel for which the displacement vector is calculated and the remaining reference voxels. For example, when detecting the corresponding point by dividing the reference volume data into a plurality of blocks, the displacement vector calculated for a representative reference voxel can be equally applied to other reference voxels contained in the same block.

Figure 15:
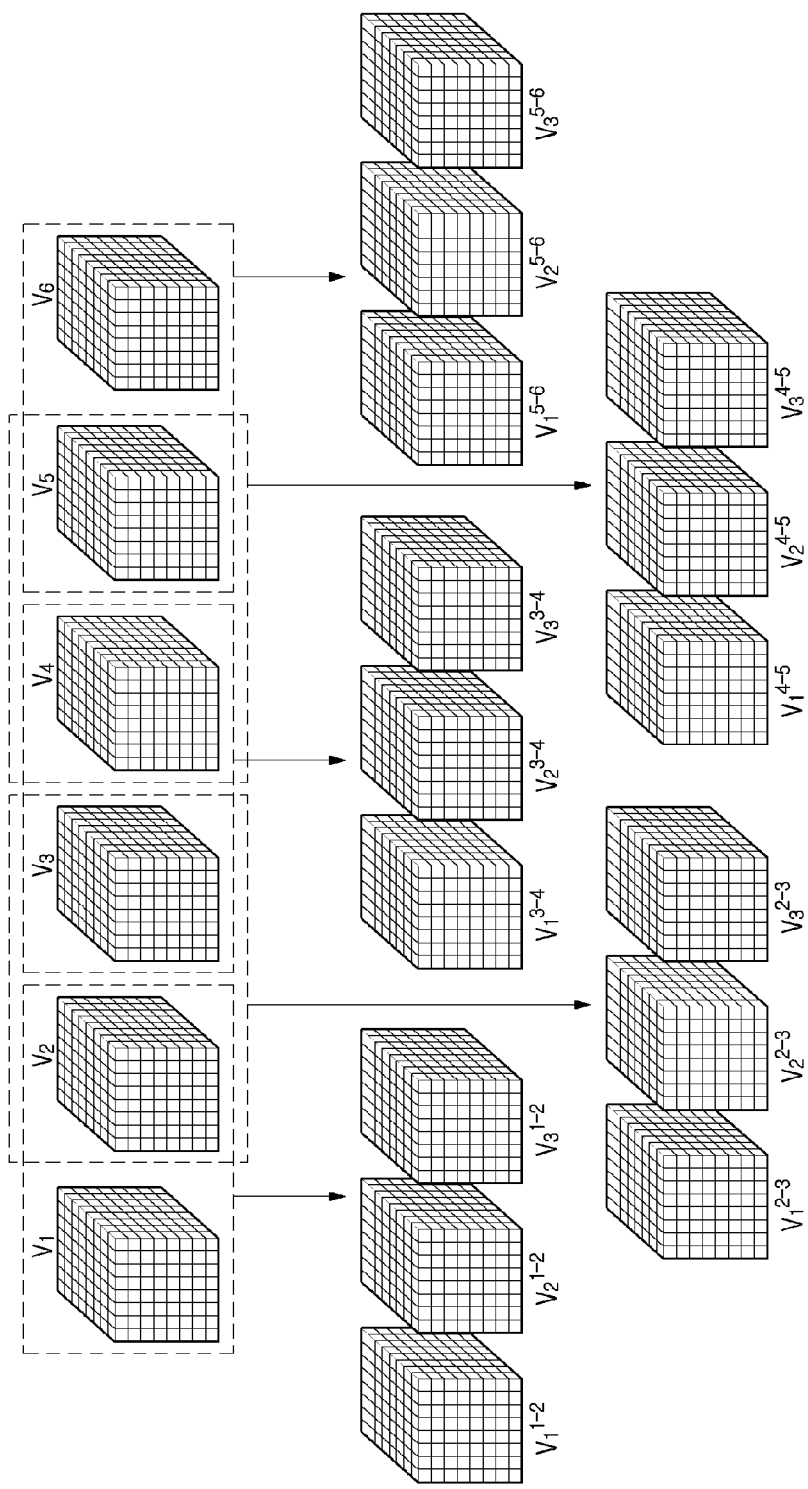
FIG. 15 is a conceptual diagram illustrating a method for generating intermediate volume data in response to input of successive volume data.

FIG. 15 is a conceptual diagram illustrating a method for generating intermediate volume data in response to input of successive volume data.

Referring to FIG. 15, the intermediate volume data ($V_1^{1-2}$, $V_2^{1-2}$, $V_3^{1-2}$) may be generated by using the first volume data $V_1$ and the second volume data $V_2$. The intermediate volume data ($V_1^{2-3}$, $V_2^{2-3}$, $V_3^{2-3}$) may be generated by using the second volume data $V_2$ and the third volume data $V_3$. The intermediate volume data ($V_1^{3-4}$, $V_2^{3-4}$, $V_3^{3-4}$) may ay be generated by using the third volume data $V_3$ and the fourth volume data $V_4$. The intermediate volume data ($V_1^{4-5}$, $V_2^{4-5}$, $V_3^{4-5}$) may be generated by using the fourth volume data $V_4$ and the fifth volume data $V_5$ The intermediate volume data ($V_1^{5-6}$, $V_2^{5-6}$, $V_3^{5-6}$) may be generated by using the fifth volume data $V_5$ and the sixth volume data $V_6$.

Generation of the intermediate volume data may be achieved in real time, or may also be achieved after completion of volume data input. In the former case, if the volume data is input, the intermediate volume data may be generated by using the current volume data and the previous volume data. Referring to the example of FIG. 15, if the first volume data is input and the second volume data is then input, the intermediate volume data ($V_1^{1-2}$, $V_2^{1-2}$, $V_3^{1-2}$) may be generated by using the second volume data and the first volume data. If the third volume data is input, the intermediate volume data ($V_1^{2-3}$, $V_2^{2-3}$, $V_3^{2-3}$) may be generated by using the third volume data $V_3$ and the second volume data $V_2$. In this case, the current volume data may be used as reference volume data, or the previous volume data may be used as the reference volume data. The image processing apparatus has no limitation with respect to specific information that indicates which one of the previous volume data and the current volume data will be used as the reference volume data. In addition, as described above, when the displacement vector generator generates the bidirectional displacement vector, the current volume data may be used as the reference volume data, and the previous volume data may be used as the reference volume data. If the intermediate volume data is generated in real time and the input volume data and the generated intermediate volume data are displayed in real time according to a time sequence, a three-dimensional (3D) moving image obtained at a high-speed volume rate, i.e., a four-dimensional (4D) image, can be displayed for user recognition.

Figure 16:
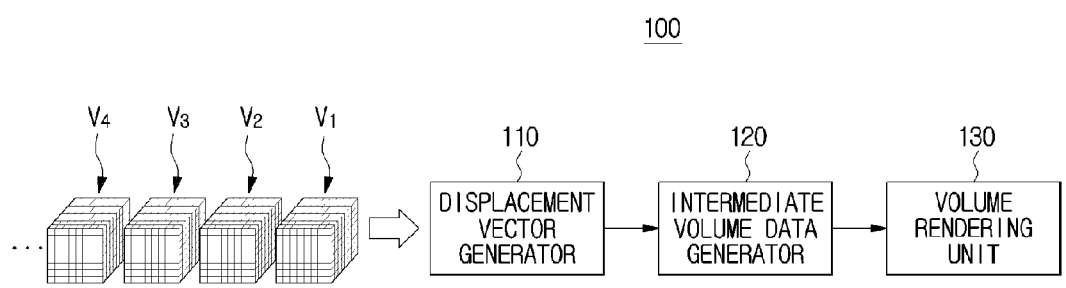
FIG. 16 is a control block diagram illustrating an image processing apparatus that further includes a volume rendering unit.

FIG. 16 is a control block diagram illustrating an image processing apparatus that further includes a volume rendering unit.

Referring to FIG. 16, the image processing apparatus 100 may further include a volume rendering unit (also referred to herein as a "volume renderer") 130 configured to generate a plurality of frame images by rendering the input volume data and the generated intermediate volume data.

The volume rendering scheme for visualizing 3D volume data may be broadly classified into the surface rendering scheme and the direct rendering scheme. The surface rendering scheme may estimate surface information on the basis of not only a user-established scalar value based on volume data but also the spatial change amount. The surface rendering scheme may convert the surface information into geometric elements such as polygons, curved patches, or the like, and then perform visualization. A representative surface rendering scheme may include a marching-cubes algorithm.

The direct rendering scheme may directly visualize the volume data without performing an intermediate step for changing the surface into geometric elements. The direct rendering scheme may be classified into the image-order algorithm and the object-order algorithm according to the search scheme of volume data. The object-order algorithm searches for the volume data according to the storage order, and combines each voxel with the pixel that corresponds to this voxel. A representative example of the object-order algorithm is the splatting scheme. The image-order algorithm may determine each pixel value according to the order of scan lines of the image, and may sequentially determine the pixel value that corresponds to volume data according to light starting from each pixel. Representative examples of the image-order algorithm include ray casting and ray tracing.

Ray casting may be applied by calculating the color and opacity values at each sample point located at a light ray through irradiation of the light ray from respective pixels constructing an image plane, and then determining the value of the corresponding pixel by combination of the calculated resultant values. The method for irradiating the light ray (i.e., projection schemes) may be classified into parallel projection and perspective projection. Ray tracing is used to trace a path of the light ray as seen by the viewer's eyes. By contrast with ray casting, in which the light ray searches for only an intersection point at which the light ray meets a volume of the target object, the phenomenon such as reflection and refraction of the light ray can be reflected by tracking the path of the irradiated light ray. Ray tracing can be classified into forward ray tracing and reverse ray tracing. In accordance with forward ray tracing, a light ray emitted from a virtual light source reaches a target object so that reflection, scattering, and transmission of the light ray are modeled so as to search for a specific light ray as seen by the viewer's eyes. Reverse ray tracing is used to reversely trace the path of a light ray as seen by the viewer's eyes.

In addition, the volume rendering unit 130 may render volume data at a plurality of time points according to categories of display units to be used for displaying frame images, and thus generate a stereoscopic image for enabling the viewer to feel a three-dimensional (3D) effect. For example, if an image is rendered at a left viewpoint and a right viewpoint, and if the left-view rendering image and the right-view rendering image are properly combined with each other, a stereoscopic image for indicating a 3D effect can be generated. Of course, other rendering schemes, in addition to the above-mentioned rendering scheme, may also be performed by the volume rendering unit 130.

The above-mentioned image processing apparatus and method can be applied to general imaging technical fields, and can also be applied to medical imaging technical fields. An exemplary medical imaging apparatus applicable to the above-mentioned imaging processing apparatus and method will hereinafter be described in detail.

Figure 17:
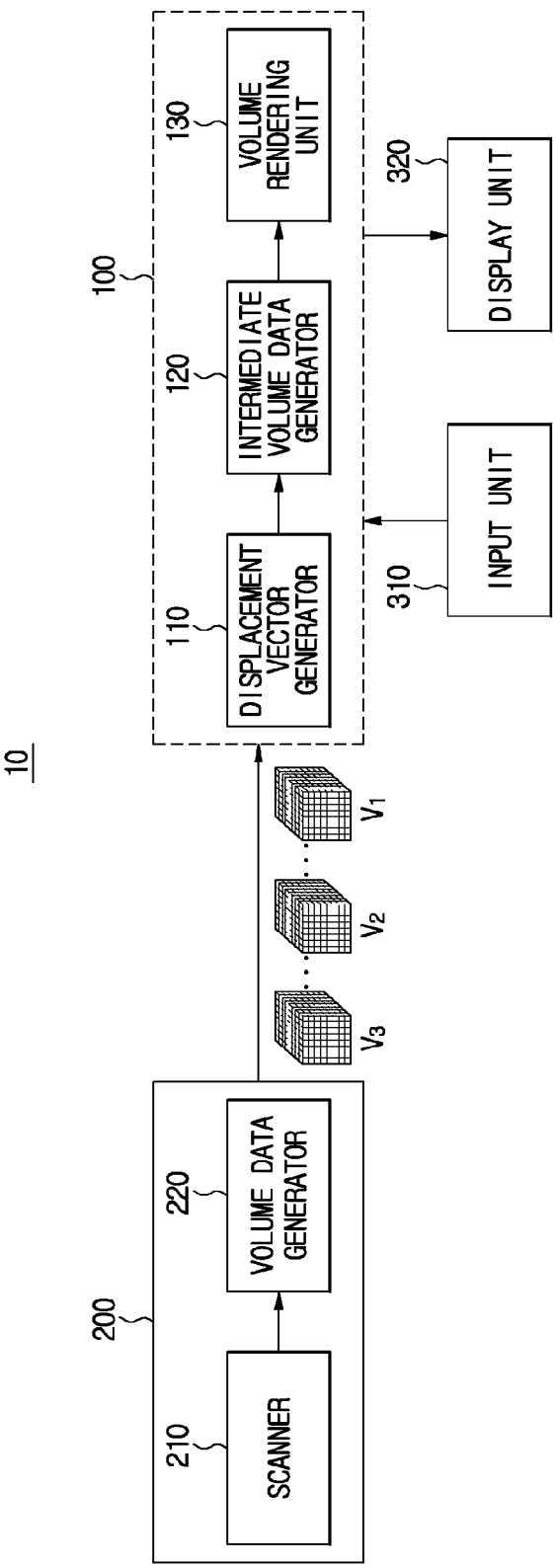
FIG. 17 is a control block diagram illustrating a medical imaging apparatus, according to an exemplary embodiment.

FIG. 17 is a control block diagram illustrating a medical imaging apparatus, according to an exemplary embodiment.

Referring to FIG. 17, the medical imaging apparatus 10 may include a volume data acquisition unit (also referred to herein as a "volume data acquirer") 200 configured to obtain volume data; an image processing apparatus 100, upon receiving the volume data from the volume data acquisition unit 200, configured to visualize a 3D moving image by generating intermediate volume data and performing volume rendering; an input unit (also referred to herein as an "input device") 310 configured to receive a user command related to control of the medical imaging apparatus 10; and a display unit (also referred to herein as a "display device" and/or as a "display") 320 configured to display the 3D moving image.

The volume data acquisition unit 200 may include a scanner 210 configured to obtain image data of a target object by applying radiation, ultrasonic waves or a magnetic field to the target object; and a volume data generator 220 configured to recover a 3D volume by using the acquired image data. For example, image data acquired by the scanner 210 may include a plurality of 2D image data, and the volume data generator 20 may recover a 3D volume from the plurality of 2D image data.

Figure 18:
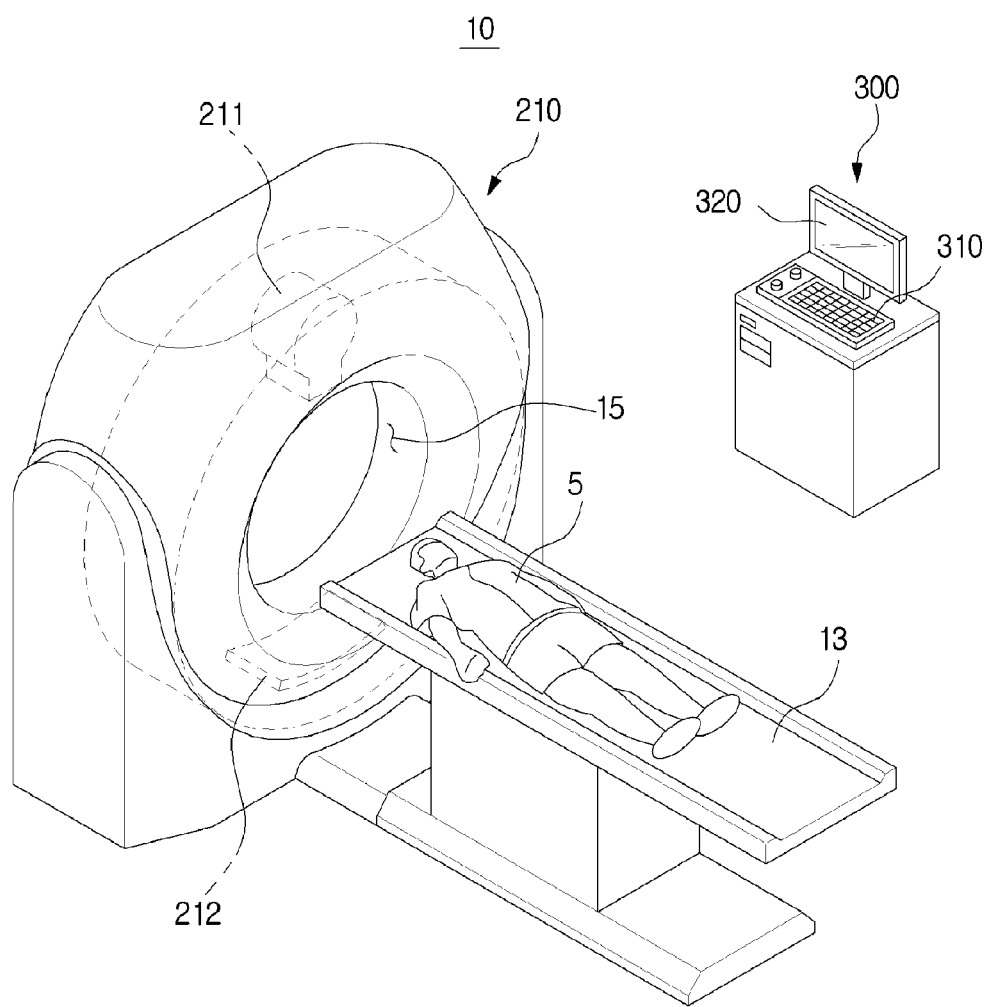
FIG. 18 shows the external appearance of a computed tomography (CT) apparatus used as the medical imaging apparatus.

In more detail, and referring also to FIG. 18, the volume data generator 220 may reconstruct the image data acquired by the scanner 210, so that it may generate a tomography image of the target object 5. The tomography image is a cross-sectional view of the target object. As the examples for reconstructing the projection data, any of an iterative method, a direct Fourier method, a back projection method, a filtered back-projection scheme, etc. may be used.

The iterative method successively corrects projection data until data that corresponds to locations which are close to the original structure of the target object is obtained. The back projection method returns projection data obtained from a plurality of time points to one screen. The direct Fourier scheme converts projection data of the space region into projection data of the frequency region. The filtered back-projection scheme performs filtering to offset a blurred part formed in the vicinity of the center part of projection data, and then performs back-projection. For example, if the reconstructed tomogram is an X-Y plane image in a 3D space composed of an X-axis, a Y-axis, and a Z-axis, image data can be obtained from different positions in the Z-axis direction, and a plurality of tomograms can be reconstructed in the Z-axis direction. A plurality of tomograms may be accumulated in the Z-axis direction so as to recover the 3D volume.

The operations of the medical imaging apparatus 10 will hereinafter be described with reference to the external appearance of a detailed example of the medical imaging apparatus 10.

Figure 19:
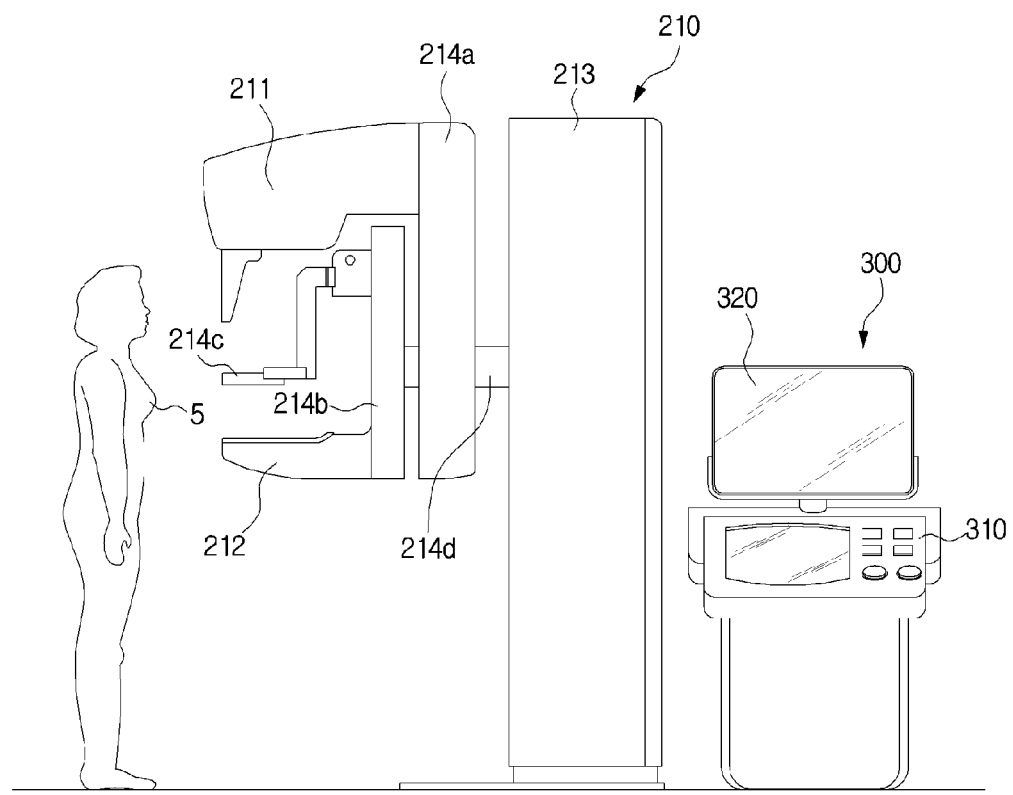
FIGS. 19 and 20 show the external appearances of a tomosynthesis apparatus used as the medical imaging apparatus.
Figure 20:
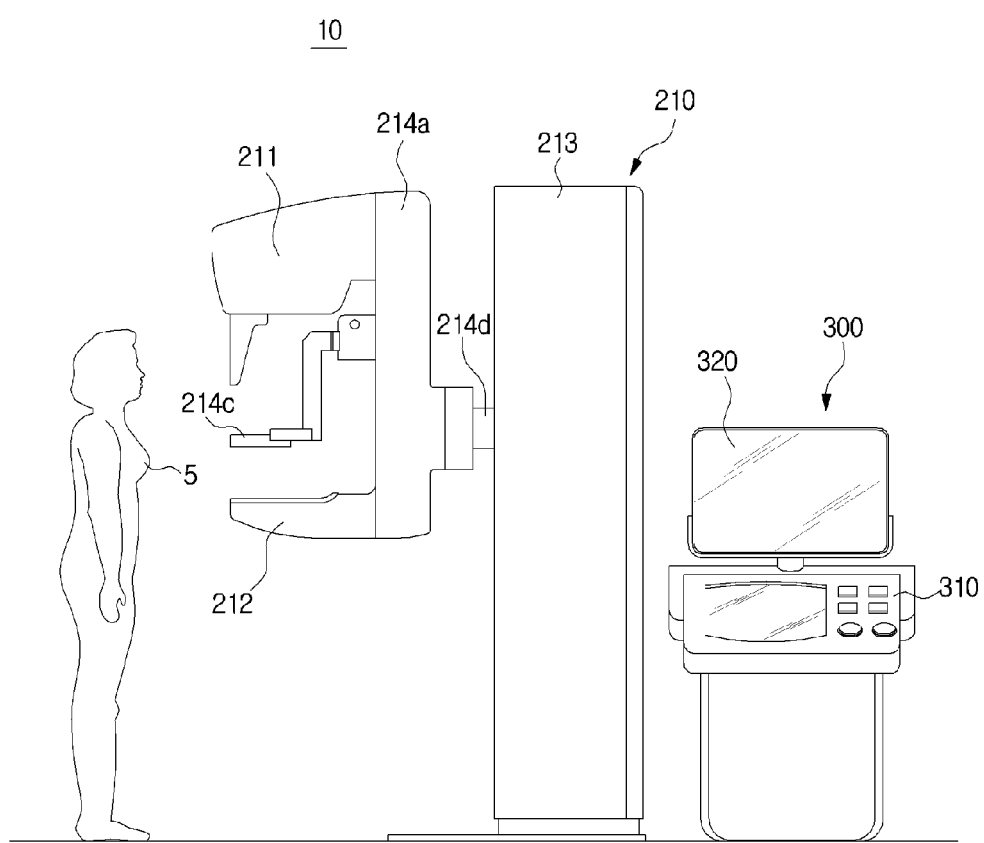
Figure 21:
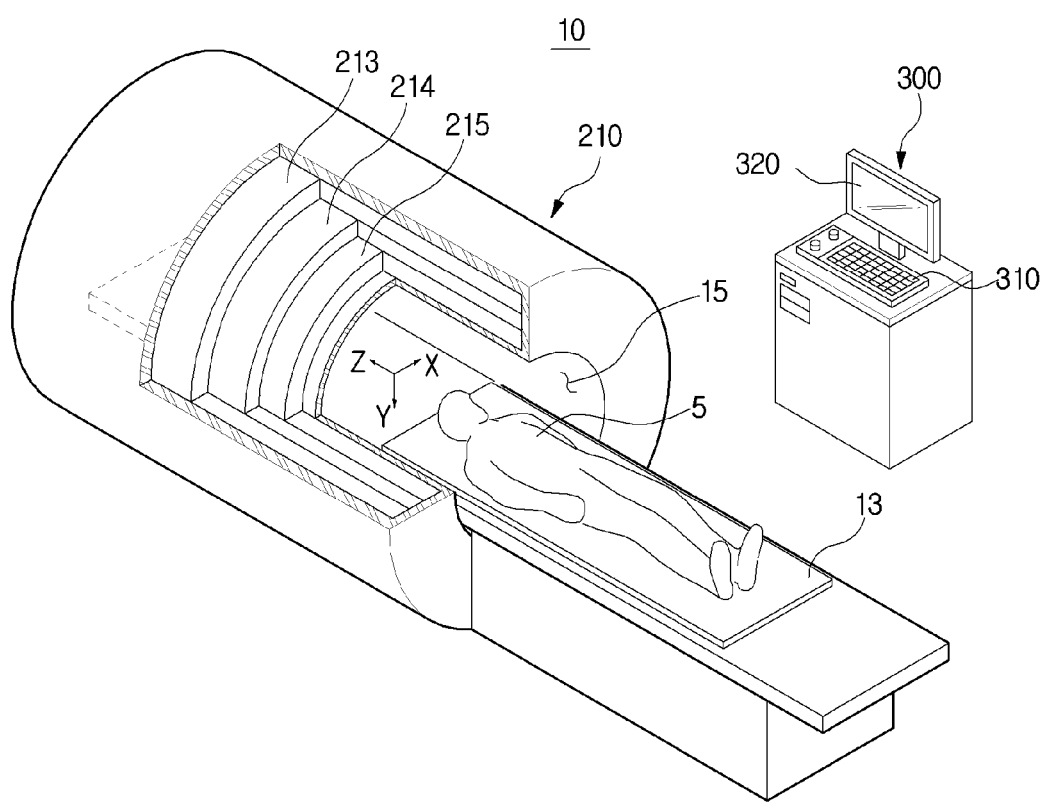
FIG. 21 shows the external appearance of a magnetic resonance imaging (MRI) apparatus used as the medical imaging apparatus.
Figure 22:
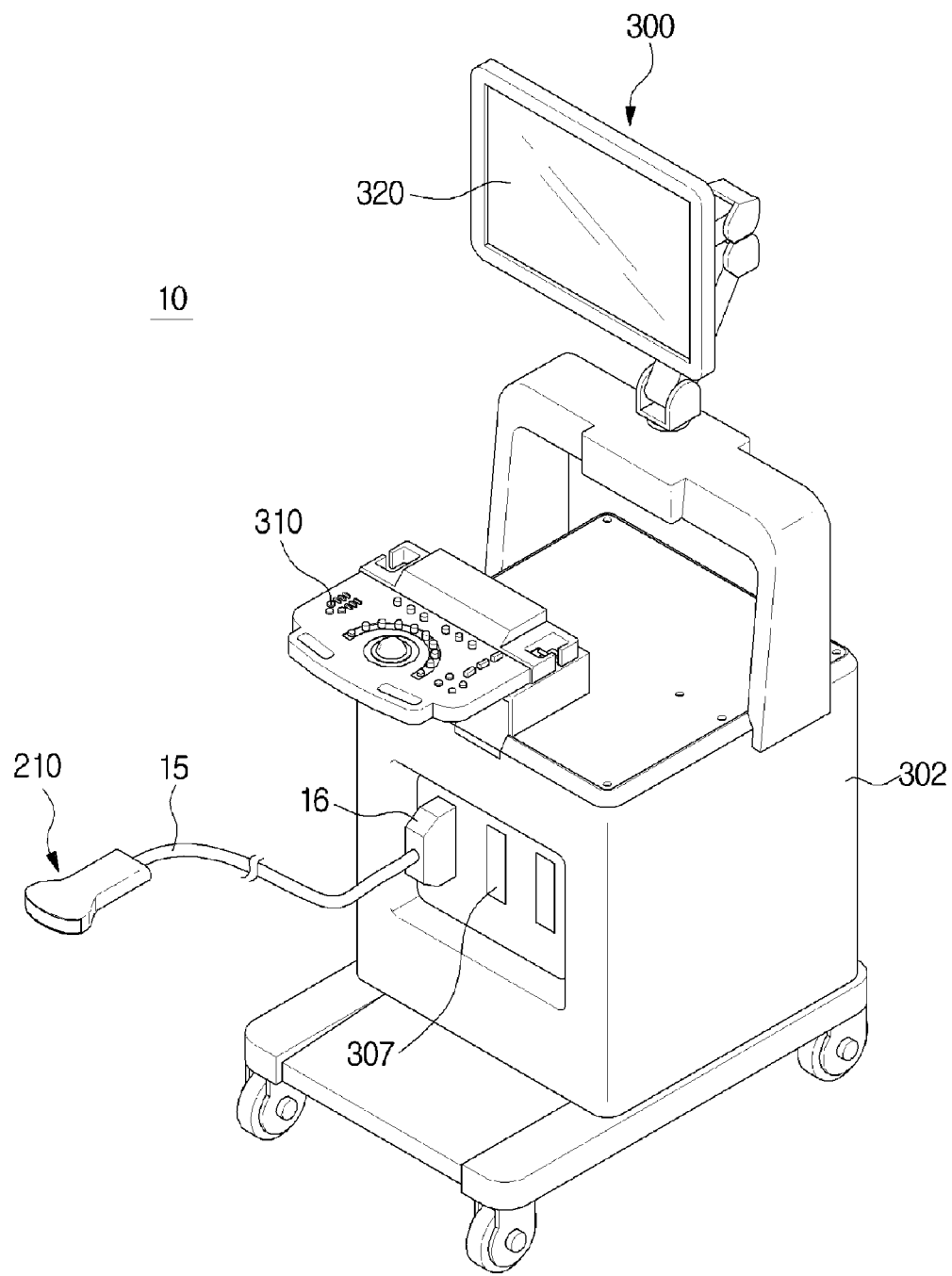
FIG. 22 shows the external appearance of an ultrasonic imaging apparatus used as the medical imaging apparatus.

FIG. 18 shows the external appearance of a computed tomography (CT) apparatus used as the medical imaging apparatus. FIGS. 19 and 20 show the external appearances of a tomosynthesis apparatus used as the medical imaging apparatus. FIG. 21 shows the external appearance of a magnetic resonance imaging (MRI) apparatus used as the medical imaging apparatus. FIG. 22 shows the external appearance of an ultrasonic imaging apparatus used as the medical imaging apparatus.

If the medical imaging apparatus 10 is a Computed Tomography (CT) apparatus, the medical imaging apparatus 10 may include an X-ray source 211 configured for emitting X-rays toward the target object 5 and a detection module 212 for detecting X-rays that have propagated through the target object 5. If a patient table 13 on which the target object 5 is located is transferred to the inside of the bore 15, the X-ray source 211 and the detection module 212 face each other, rotate about a longitudinal axis of the bore 15 by an angle of 360 degrees so as to scan the target object 5, and thus projection data is obtained.

The input unit 310 and the display unit 320 may be mounted to a workstation 300. The workstation 300 may provide the same user interface as in the input unit 310 and the display unit 320, and may form an image to be displayed on the display unit 320 by using the image data obtained from the scanner 210. Therefore, although not shown in the drawings, the volume data generator 220 and the image processing apparatus 100 may also be mounted to the workstation 300. In this aspect, the volume data generator 220 may be implemented by a processor such as a Central Processing Unit (CPU), may be physically separated from the image processing unit 100, and may partially or entirely share the processor configured to implement the image processing apparatus 100. The input unit 310 may be implemented by an input device that includes any one or more of a mouse, a keyboard, a trackball, and a touch panel. The display unit 320 may be implemented by a display device that includes at least one of a Liquid Crystal Display (LCD), a Light Emitting Diode (LED), an Organic Light Emitting Diode (OLED), a Plasma Display Panel (PDP), and a Cathode Ray Tube (CRT).

The user may input a control command associated with the operation of the image processing apparatus 100 via the input unit 310. For example, the user may input a command that indicates whether a bidirectional displacement vector is generated, a command that indicates the number of intermediate volume data to be generated, a command that indicates whether to detect the corresponding points of all reference voxels, and a command that indicates the size (or the like) of a search range of target volume data. However, the above-described exemplary embodiment is merely an example, and all or some parts of the above-mentioned input commands may also be automatically established in the image processing apparatus 100.

In addition, the medical imaging apparatus 10 may also receive a control command associated with the scanning operation via the input unit 310. For example, the medical imaging apparatus 10 may receive commands for establishing various capture parameters (e.g., a tube voltage, a tube current, a target material, an exposure time, the number of slides, etc.) or may also receive other commands associated with movement of the patient table 13. However, the above-described exemplary embodiment is merely an example, and all or some parts of the above-mentioned input commands may also be automatically established in the medical imaging apparatus 10. For example, the medical imaging apparatus 10 may include an Auto Exposure Controller (AEC), so that it may automatically establish the capture parameters such as tube voltage, tube current, target material, exposure time, etc.

The display unit 320 may display a 2D image, or may also display a 3D image. The operation for displaying the 2D image renders/displays a volume of a target object, and provides 3D information related to the internal structure of the target object, so that the user who can view the display unit 320 does not sense a stereoscopic effect. The operation for displaying the 3D image performs rendering of the target object volume from a plurality of viewpoints, so that a stereoscopic image capable of providing the user with a stereoscopic effect can be displayed.

For example, if the display unit 320 is implemented according to the stereoscopic scheme, the viewer wears special glasses so that he or she can view a 3D image displayed on the display unit 320. In more detail, the stereoscopic scheme can be classified into a polarizing glasses scheme and a shutter glasses scheme. The polarizing glass scheme divides a plurality of scan lines that constitute the display unit 320 into even lines and odd lines, so that an image rendered at a left viewpoint and an image rendered at a right viewpoint are displayed at respective scanning lines. A polarization filter capable of divisionally outputting two images may be mounted to the front surface of the display unit 320. Different polarization plates may be respectively mounted to a left lens and a right lens of the special glasses. The left-view image can be displayed only through the left lens, and the right-view image can be displayed only through the right lens. In accordance with the shutter glasses scheme, the display unit 320 may alternately display the image rendered at the left-view rendered image and the right-view rendered image. In this case, the shutter mounted to the special glasses may be selectively opened or closed in association with the display unit 320.

Further, the display unit 320 may also employ the autostereoscopic scheme in which the special glasses are not used. The autostereoscopic scheme may be classified into a multi-view scheme, a volumetric scheme, an integral image scheme, etc. For this purpose, the volume rendering unit 130 may render the 3D volume data from a plurality of viewpoints so as to generate a multi-view stereoscopic image, and a technology for combining images that correspond to respective viewpoints will hereinafter be referred to as weaving technology. The multi-view stereoscopic image is output to the display unit 320, and the display unit 320 may stereoscopically display the multi-view stereoscopic image. In this case, the display unit 320 may include a lenticular lens and a parallax barrier. The lenticular lens performs separation of the left-view image and the right-view image by collecting light, and the parallax barrier blocks out the light so as to separate the left-view image and the right-view image from each other, so that the viewer can feel a stereoscopic effect without wearing special glasses.

Still further, the medical imaging apparatus 10 may also include a positron Computed Tomography (CT) device. In this case, medicines combined with radioactive isotopes emitting positrons are injected into the human body, and the injected medicines are traced so that it is possible to recognize distribution thereof in the human body. In this case, the external appearance of the medical imaging apparatus 10 is similar to that of the CT device shown in FIG. 18. The emitted positrons are combined with electrons located in the vicinity of a target part of the human body, so that the positrons disappear. As a result, gamma rays are emitted in opposite directions. The emitted gamma rays penetrate living tissues, and the scanner 210 may include a radiation detection module for detecting gamma rays that have penetrated the living tissues. Since it is impossible to predict the emission direction of the gamma rays, the radiation detection module for use in the positron CT includes a plurality of detectors arranged in the form of a circular ring enclosing the target object.

If the medical imaging apparatus 10 is a tomosynthesis device, the medical imaging apparatus 10 may have an external appearance as shown in FIG. 19 or FIG. 20. The tomosynthesis device may indicate a medical imaging apparatus that is configured for obtaining a tomogram of the breast by scanning the breast from different viewpoints.

Referring to FIGS. 19 and 20, the scanner 210 may include an X-ray source 211 for emitting X-rays to the breast 5 and a detection module 212 for detecting the X-rays that have penetrated the breast 5 and propagated therethrough. A pressing paddle 214c configured to be movable in the vertical direction may press the breast 5 by a predetermined thickness in such a manner that tissues overlapping in the X-ray emission direction are spread and the breast thickness is effectively reduced, so that high definition and more accurate images can be obtained. The thickness of the pressed breast 5 may be prestored as a default value, or the user may directly input a desired thickness via the input unit 320 or may manually control the movement of the pressing paddle 214c as necessary.

A first arm 214a or a second arm 214b for interconnecting the X-ray source 211 and the detection module 212 may be connected to the main body 213 through a shaft 214d. As one example for scanning the breast 5 from different viewpoints, the first arm 214a connected to the X-ray source 211 may rotate around the shaft 214d by a predetermined angle, so that X-rays may be emitted to the breast 5, as shown in FIG. 19. In this case, the detection module 212 may be fixed and only the X-ray source 211 may rotate. Alternatively, assuming that the X-ray source 211 and the detection module 212 are connected to the first arm 214a and thus an integrated structure is achieved as shown in FIG. 20, the X-ray source 211 and the detection module 212 may rotate while the first arm 214a simultaneously rotates around the rotating shaft 214d.

The operations of the workstation 300, the input unit 310, and the display unit 320 are identical to those of FIG. 18, and as such a detailed description thereof will herein be omitted for convenience of description.

If the medical imaging apparatus includes the MRI device, as illustrated in FIG. 21, the scanner 210 may include a static-field coil 213 which is configured for forming a static field in the bore 15; a gradient coil 214 configured to form a gradient field by generating a gradient in the static field; and an RF coil 215 configured to excite an atomic nucleus by applying RF pulses as well as to receive an echo signal from the excited atomic nucleus.

If the patient table 13 that has the bore 15 in which the target object is located is transferred, the static field, the gradient field, and the RF pulse are applied to the target object 5, so that the atomic nucleus constructing the target object 5 is excited and thus the echo signal is generated from the excited atomic nucleus. The RF coil 215 receives the echo signal and transmits the received echo signal to the volume data generator 220. Although not shown in the drawings, the workstation 300 may include a controller. The controller controls the intensity and direction of a static field, designs a pulse sequence, and thus controls the gradient coil 213 and the RF coil 215. The input unit 310 may receive a control command from the user, a command associated with transfer of the patient table 13, or a control command associated with the operation of the image processing apparatus 100.

The volume data generator 220 may include a pre-amplifier configured to amplify a magnetic resonance signal received by the RF coil 215; a phase detector configured to detect a phase upon receiving the magnetic resonance signal from the pre-amplifier; and an A/D converter configured to convert an analog signal acquired by phase detection into a digital signal. In addition, the volume data generator 220 may include a memory configured to store the digital magnetic resonance signal. A data space for constructing a 2D Fourier space is formed in the memory. If a total amount of scanned data is completely stored, the volume data generator 220 may perform a 2D inverse Fourier transform of data contained in the 2D Fourier space, so that the volume data generator 220 may reconstruct the 2D tomogram of the target object. If the reconstructed tomogram indicates a cross-sectional view of the target object, a plurality of tomograms obtained at different positions arranged on a longitudinal axis may be accumulated so that a 3D volume of the target object is reconstructed, resulting in formation of volume data. The generated volume data is input to the image processing apparatus 100.

If the medical imaging apparatus is an ultrasonic imaging apparatus, the scanner 210 may be implemented as an ultrasonic probe as shown in FIG. 22. The ultrasonic probe 210 may be connected to a main body 302 of the ultrasonic imaging apparatus 10 via the cable 15. A connector 16 capable of being detachably coupled to a slot 307 of the main body 302 may be provided at one end of the cable 15. The ultrasonic probe 210 may receive various signals needed for controlling the ultrasonic probe 210 via the cable 15, and may transmit the analog or digital signal corresponding to the ultrasonic echo signal received by the ultrasonic probe 210 to the main body 302. However, the scope or spirit of the ultrasonic probe is not limited thereto, and the ultrasonic probe may be implemented as a wireless probe, so that the ultrasonic probe may communicate with the main body 302 over a network formed therebetween.

The ultrasonic imaging apparatus 10 may image the inside of the target object without exposure of the target object, and may be implemented to have a smaller size and a lower price than other medical imaging apparatuses and may also be imaged in real time. Therefore, the ultrasonic imaging apparatus 10 may display 3D moving images obtained by the image processing apparatus 100 in real time. A detailed example of the ultrasonic imaging apparatus 10 will hereinafter be described in detail.

Figure 23:
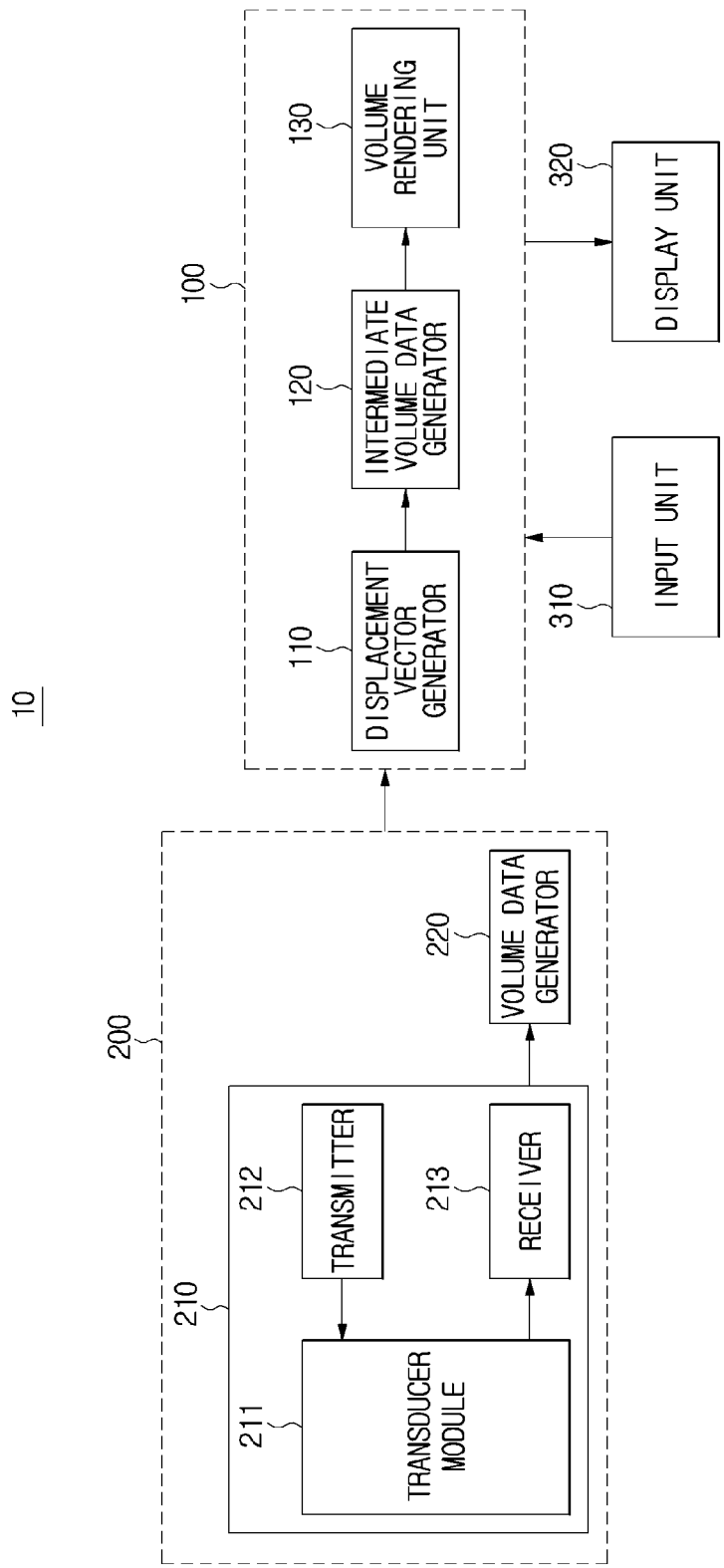
FIG. 23 is a control block diagram illustrating an ultrasonic imaging apparatus, according to an exemplary embodiment.
Figure 24:
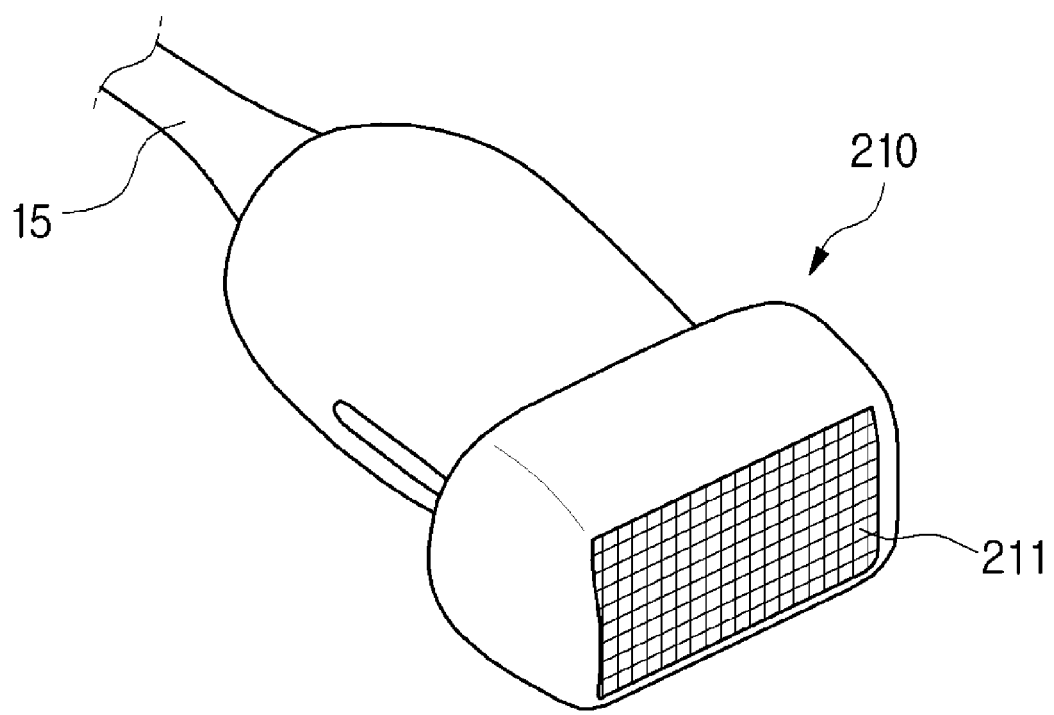
FIG. 24 shows the external appearance of an ultrasonic probe for use in the ultrasonic imaging apparatus, according to an exemplary embodiment.
Figure 25:
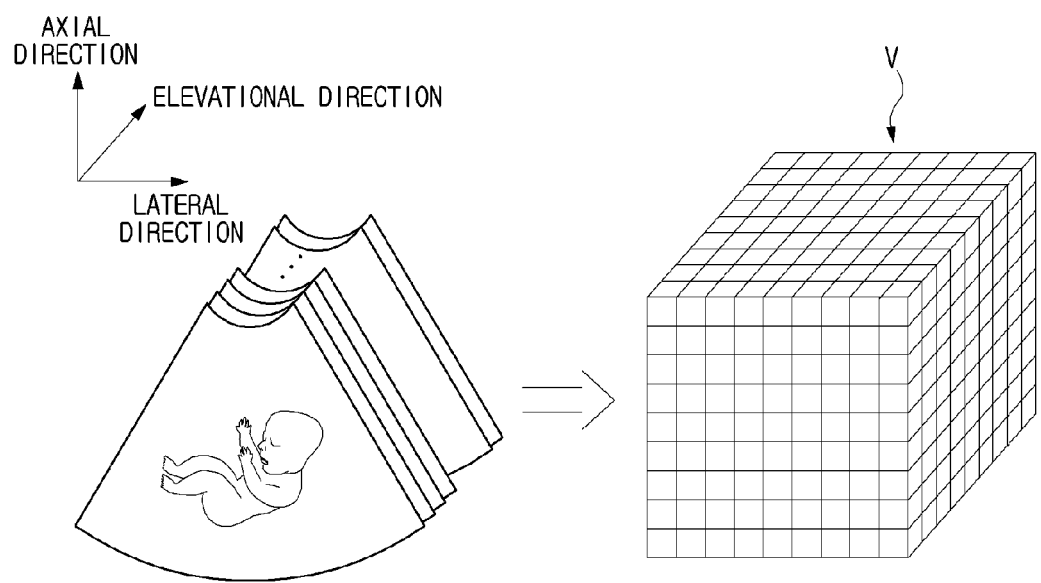
FIG. 25 is a conceptual diagram illustrating a method for generating volume data that is performed by an ultrasonic imaging apparatus, according to an exemplary embodiment.

FIG. 23 is a control block diagram illustrating an ultrasonic imaging apparatus, according to an exemplary embodiment. FIG. 24 shows the external appearance of an ultrasonic probe for use in the ultrasonic imaging apparatus, according to an exemplary embodiment. FIG. 25 is a conceptual diagram illustrating a method for generating volume data by an ultrasonic imaging apparatus, according to an exemplary embodiment.

Referring to FIG. 23, the ultrasonic probe 210 may include a transducer module 211 configured to convert an ultrasonic signal into an electric signal or vice versa; a transmitter 212 configured to generate a transmission (Tx) signal and transmit the Tx signal to the transducer module 211; and a receiver 213 configured to receive the electric signal obtained by conversion of an ultrasonic echo signal from the transducer module 21 and to amplify and focus the received electric signal.

The transducer module 211 may convert the signal received from the transmitter 211 into an ultrasonic signal, may emit the ultrasonic signal to the target object, and may convert the ultrasonic echo signal reflected from the target object into an electric signal. For this purpose, the transducer module 211 may include any of a magnetostrictive ultrasonic transducer using magnetostrictive effects of a magnetic material, a piezoelectric ultrasonic transducer using piezoelectric effects of a piezoelectric material, and/or a piezoelectric micromachined ultrasonic transducer (pMUT). If necessary, the transducer module 211 may also include capacitive micromachined ultrasonic transducer (cMUT) to transmit and receive ultrasonic waves using vibration of several hundred or thousand micromachined thin films.

Referring to FIG. 24, the transducer module 211 may include a plurality of transducer elements with a certain arrangement. In order to obtain the 3D ultrasonic image, the transducer module 211 may also have a 2D arrangement. However, the scope or spirit of the transducer module is not limited to the 2D arrangement, and the transducer module may also be steered mechanically using a one-dimensional arrangement.

Referring to FIG. 23, the transmitter 212 may include a transmission (Tx) beamformer and a pulser. The Tx beamformer may assign a proper time delay to the Tx signal applied to respective transducer elements, and thus focus ultrasonic beams. The pulser may generate a pulse-shaped Tx signal and transmit the pulse-shaped Tx signal to the transducer module 211.

The receiver 213 may include an amplifier configured to amplify a reception (Rx) signal received from the transducer module 211 and a reception (Rx) beamformer configured to assign a proper time delay to the Rx signal so as to focus the Rx signal. If the beamforming target of the Rx beamformer is an analog signal, the Rx beamformer is implemented as an analog beamformer. If the beamforming target of the Rx beamformer is a digital signal, the Rx beamformer is implemented as a digital beamformer. In the latter case, the receiver 213 may further include an ADC (Analog-to-Digital Converter). Although the receiver 213 for use in the former case may further include the ADC, it should be noted that the ADC may not be contained in the receiver 213, and may instead be contained in the volume data generator 220 and implemented as a back-end part.

If a digital or analog ultrasonic image signal that corresponds to the ultrasonic echo signal is transferred from the ultrasonic probe 210 to the volume data generator 220, the volume data generator 220 may perform signal processing of the input ultrasonic image signal, and may generate ultrasonic image data. The volume data generator 220 may perform envelope detection processing for detecting the magnitude of the ultrasonic echo signal on the basis of the focused digital ultrasonic image signal, resulting in formation of ultrasonic image data. In this aspect, it may be possible to form ultrasonic image data on the basis of not only position information of several focusing points arranged on individual scan lines, but also data acquired from the individual focusing points. In particular, the ultrasonic image data may include coordinates on X-Y coordinates of each point, angle information of each scan line with respect to a vertical scan line, data acquired from each focusing point, and the like.

As shown in the left side of FIG. 25, the generated ultrasonic image data may form a 2D image that illustrates the inside of the target object. The 2D image may be defined by an axial direction and a lateral direction. By mechanical steering based on an ultrasonic probe having a 1D array or electrical steering based on ultrasonic probes arranged in a 2D array, a plurality of 2D images may be formed by using the Rx signals acquired in the elevation direction. The volume data generator 220 may accumulate a plurality of 2D images so that 3D volume data (V) can be reconstructed as shown in FIG. 25. When accumulating several 2D images, a data interpolation scheme may be used. For example, a 3D moving image of the fetus located in the womb of the mother may be displayed in real time on the display unit 320 by using the ultrasonic imaging apparatus 10. Since the image processing apparatus 10 generates the intermediate volume data using the actually obtained volume data, a high-speed volume rate can be implemented, and the movement of the fetus and the cardiac impulses of the fetus can be naturally expressed.

An image processing method according to an exemplary embodiment will hereinafter be described in detail.

The above-mentioned image processing apparatuses can perform the image processing method. Of course, the operations of the above-mentioned image processing apparatuses may also be applied to the following image processing methods to be described later without departing from the scope or spirit of the exemplary embodiments.

Figure 26:
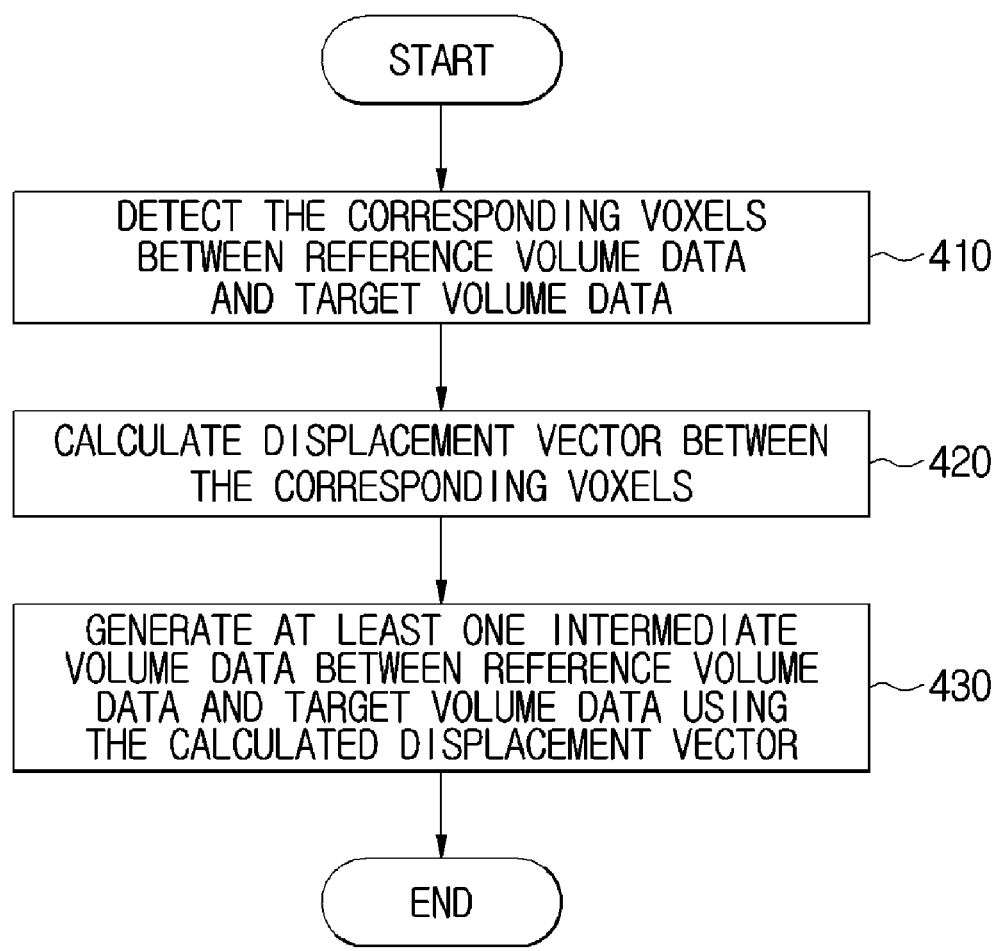
FIG. 26 is a flowchart illustrating an image processing method, according to an exemplary embodiment.

FIG. 26 is a flowchart illustrating an image processing method, according to an exemplary embodiment.

Referring to FIG. 26, the corresponding voxels disposed between the reference volume data and the target volume data may be detected in operation 410. The reference volume data and the target volume data may be acquired at intervals of a predetermined time period. In particular, the reference volume data may first be acquired, or the target volume data may first be acquired. Information that indicates which volume data will be used as a reference may be optionally established. When detecting the corresponding voxel, not only the reference voxel to be detected but also contiguous voxels adjacent to the reference voxel are considered, resulting in increased accuracy. For this purpose, the belief propagation algorithm for propagating the message value to the neighbor nodes can be applied.

A displacement vector with respect to the corresponding voxels may be calculated in operation 420. The displacement vector may include information that relates to the movement amount of each voxel and information that relates to the movement direction of each voxel. The displacement vector may indicate the movement amount and the movement direction while the reference voxel moves to the position of a target voxel that corresponds to the reference voxel, and may include an X-axis component, a Y-axis component, and a Z-axis component. Further, the displacement vector may be calculated for all or some reference voxels that constitute the reference volume data. If detection of the corresponding voxel is performed for all reference voxels, the displacement vector is calculated for all the reference voxels. If detection of the corresponding voxel is performed for some reference voxels, the displacement vector is calculated for some reference voxels. The number of reference voxels needed for calculation of the displacement vector may be determined according to the movement characteristics or image characteristics of the target object as described above.

At least one piece of intermediate volume data with respect to the reference volume data and the target volume data may be generated by using the calculated displacement vector in operation 430. The intermediate volume data may be generated by using the reference volume data and a weighted displacement vector.

The number of intermediate volume data segments to be generated with respect to the reference volume data and the target volume data may be set to a default value, may be automatically established by the image processing apparatus, or may be entered by the user via the input unit.

Figure 27:
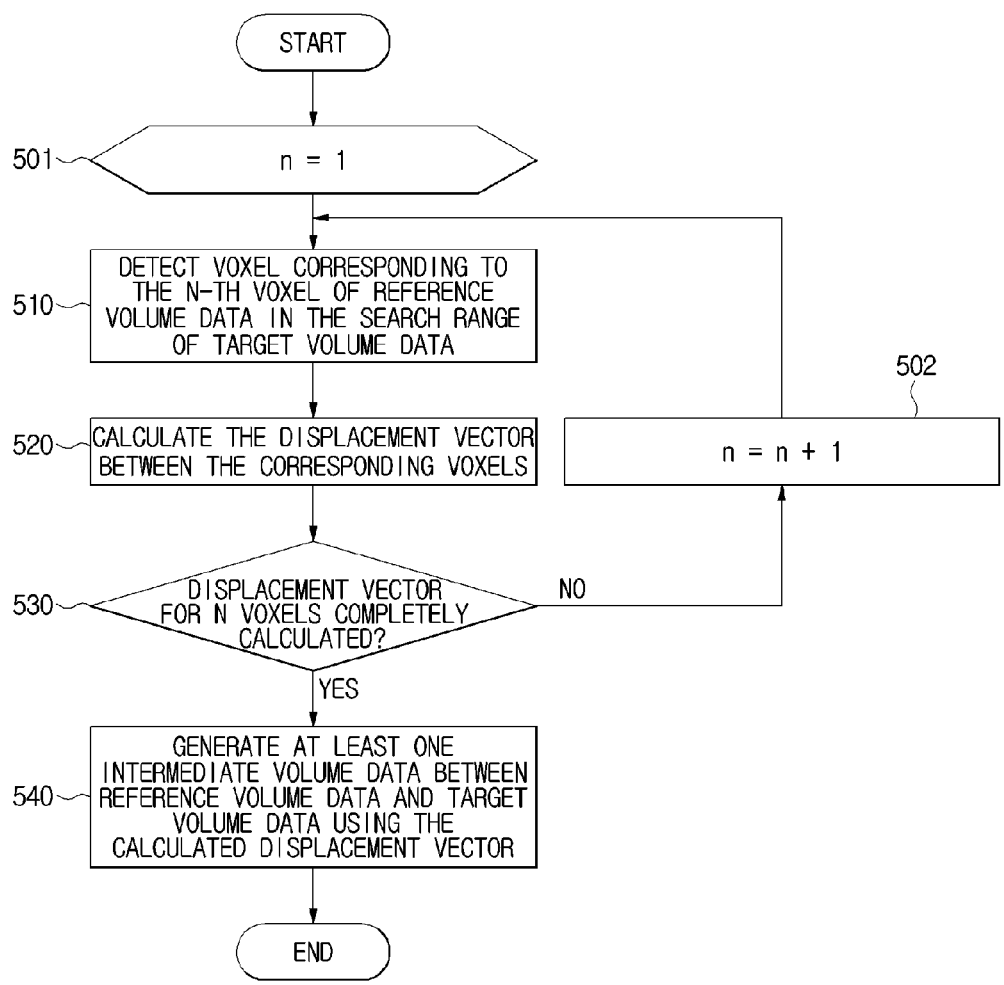
FIG. 27 is a flowchart illustrating an image processing method, according to an exemplary embodiment.

FIG. 27 is a flowchart illustrating an image processing method, according to an exemplary embodiment.

The example of FIG. 27 shows that the number of reference voxels needed to detect the corresponding target voxel is set to N (where N is an integer of 1 or greater), and a detailed description thereof will hereinafter be described. In particular, N may be equal to or less than a total number of reference voxels that constitute the reference volume data, according to the movement characteristics or image characteristics of the target object.

Referring to FIG. 27, detection of the corresponding target voxel and calculation of the displacement vector are performed from the beginning of a first voxel from among N reference voxels in operation 501. In more detail, the target voxel that corresponds to the first reference voxel of the reference volume data is detected from the search range of the target volume data in operation 510. A detailed description of target voxel detection is identical to that of FIG. 26.

The displacement vector that relates to the corresponding reference voxel and the detected target voxel is calculated in operation 520. If calculation of the displacement vector with respect to N voxels is not completed in operation 530, the corresponding target voxel for the next reference voxel is detected in operation 502, and the displacement vector is calculated. Although the corresponding voxels can be sequentially detected due to characteristics of the flowchart, the exemplary embodiment of the image processing method is not limited thereto, and detection of the corresponding voxels can also be simultaneously achieved according to categories or characteristics of the processor configured to implement the image processing apparatus. If calculation of the displacement vector with respect to N voxels is completed in operation 530, at least one piece of intermediate volume data with respect to the reference volume data and the target volume data may be generated by using the calculated displacement vector in operation 540. A detailed description of the intermediate volume data is also identical to that of FIG. 26.

Figure 28:
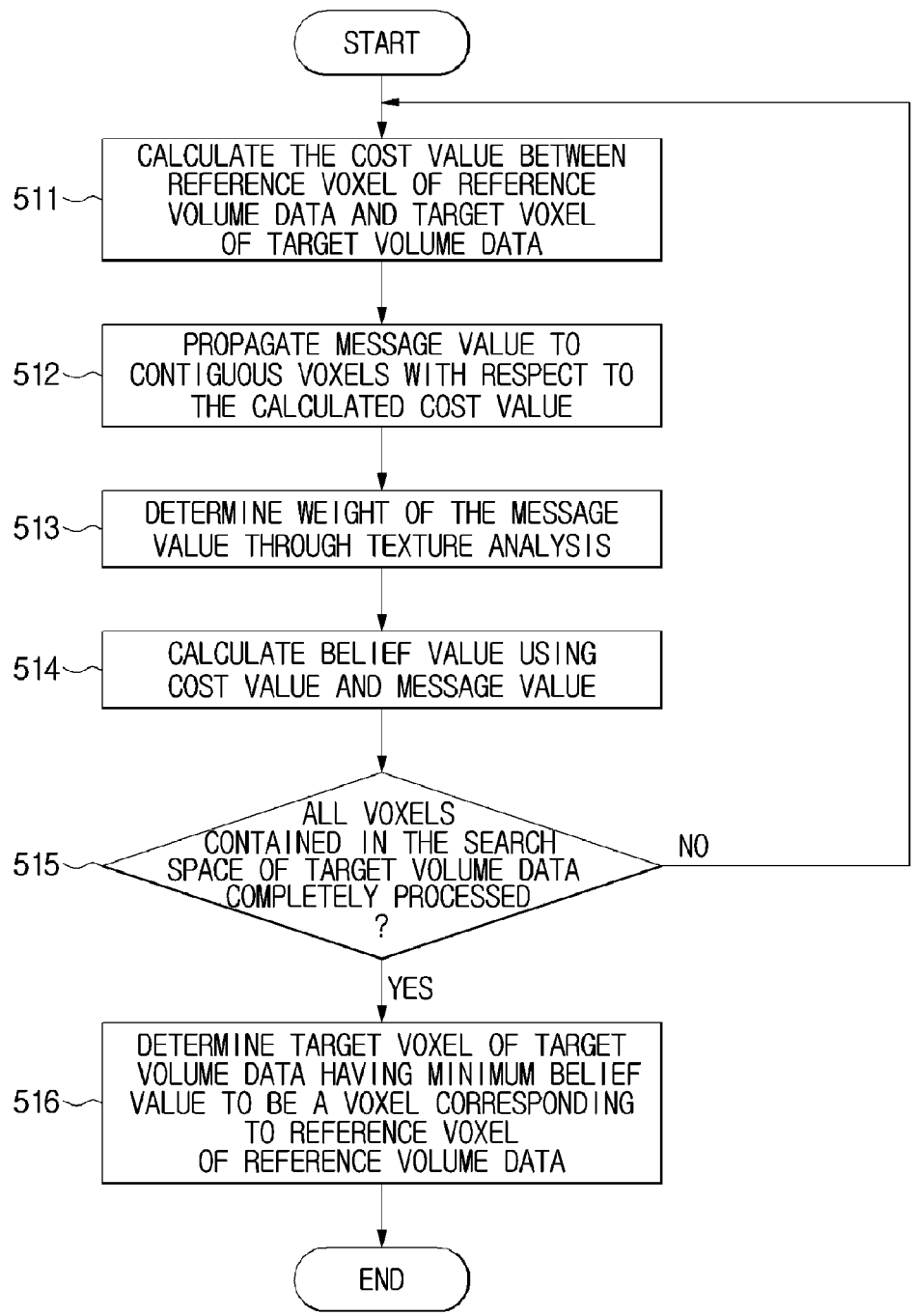
FIG. 28 is a flowchart illustrating a method for detecting a target voxel corresponding to a reference voxel.

FIG. 28 is a flowchart illustrating a method for detecting a target voxel that corresponds to a reference voxel.

As described above, when the corresponding target voxel is detected, the belief propagation algorithm may be used to consider the voxel values of contiguous voxels neighboring the corresponding voxel. A method for detecting the corresponding voxel by using the belief propagation algorithm will hereinafter be described in detail.

A cost value with respect to both of a reference voxel of the reference volume data and a target voxel of the target volume data is calculated in operation 511. In order to calculate the cost value, the cost function may be used. Of course, a minimum cost function or a maximum cost function may be used without departing from the scope or spirit of the exemplary embodiments. For example, the cost value may be calculated by using the SAD from among the minimum cost functions, as expressed in Equation 1.

In association with the calculated cost value, the message value is propagated to the contiguous voxels in operation 512. If volume data is modeled by the Markov random field, the positions of individual voxels that constitute the volume data may be represented by nodes, the message values of the contiguous nodes may be calculated on the basis of a node that corresponds to the position of a reference voxel that indicates a detection target of the corresponding voxel as expressed in Equation 2, and the calculated resultant values may be propagated among the reference voxel node and the contiguous nodes. For example, it may be estimated that nodes adjacent to the node (p) have similar voxel values. Therefore, assuming that the target voxel has a voxel value similar to those of a reference voxel and its contiguous voxels, there is a higher probability of implementing the corresponding point of the reference voxel. Therefore, accuracy of the corresponding point detection may be increased via propagation of the message value.

A weight of the message value is determined via texture analysis in operation 513. For example, if the node (p) is located at an edge, it may be difficult for the contiguous nodes adjacent to the node (p) to have similar voxel values. Therefore, a gradient value at each node is calculated via texture analysis, and an appropriate weight may be applied to the message value according to the calculated gradient value. As shown in FIG. 7, if the gradient value is relatively high, the edge region can be estimated, so that a relatively low weight can be applied. If the gradient value is relatively low, the relatively uniform region can be estimated, so that a relatively high weight can be applied. Assuming that different weight values are applied to the message value according to the gradient value between the nodes, a weight of the message value in the edge region and a weight of the message value in the relatively uniform region are changed, so that the accuracy of the belief value to be calculated in a subsequent process can be increased. However, applying the weight to the message value is an exemplary method for increasing accuracy of the corresponding point detection, and it may also be possible to apply no weight to the message value as necessary.

The belief value may be calculated by using the cost value and the message value in operation 514. In more detail, the belief value at the node (p) can be calculated by using the cost value and the message value calculated in operation 511 or by using the weighted message value, as expressed in Equation 4. If the maximum cost function is calculated in the process for calculating the cost value, the inverse of the calculated cost value is calculated and the result may be applied to the calculation process of the belief value. If the above operations 511 to 514 have been completely performed with respect to all target voxels contained in the search range of the target volume data in operation 515, a target voxel that has a minimum belief value may be determined to be a voxel that corresponds to the reference voxel in operation 516. Conversely, if the above operations 511 to 514 are not performed with respect to all of the target voxels contained in the search range of the target volume data in operation 515, the above operations 511 to 514 are repeatedly performed until all the target voxels contained in the search range are completely processed.

The size of the search range of the target volume data may be established according to the movement characteristics or the image characteristics of the target object. If the target object has movement characteristics that indicate a relatively large amount of movement, the search range may be set to a relatively large search range. If the target object has movement characteristics that indicate a relatively small amount of movement, the search range may be set to a relatively small search range. In addition, if individual regions that constitute the target object have different movement characteristics, the search range size may be variably established according to the position of a reference voxel.

A method for forming a medical image according to an exemplary embodiment will hereinafter be described in detail.

The above-mentioned medical imaging apparatuses may be configured to perform a medical image formation method according to the exemplary embodiment. Therefore, a detailed description of the above-mentioned medical imaging apparatuses may also be applied to the medical image formation method to be described below.

Figure 29:
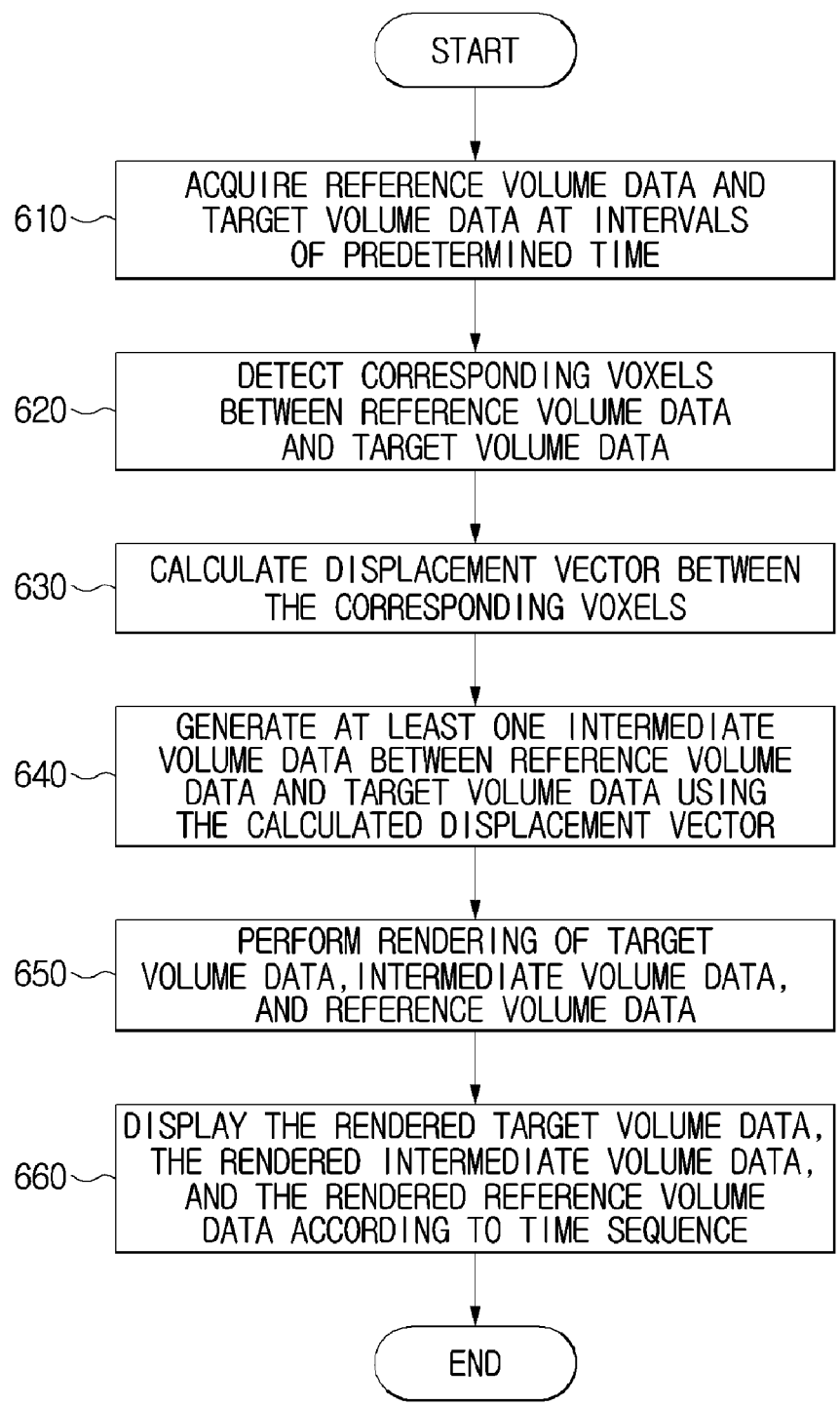
FIG. 29 is a flowchart illustrating a method for generating a medical image, according to an exemplary embodiment.

FIG. 29 is a flowchart illustrating a method for generating a medical image, according to an exemplary embodiment.

Referring to FIG. 29, reference volume data and target volume data may be acquired at intervals of a predetermined time period in operation 610. The reference volume data and the target volume data may relate to the same target object, and may be different from each other in terms of acquisition time. Thus, the reference volume data and the target volume data may indicate movement of the target object. The terms "reference" and "target" may be used to indicate which volume data will be used as a reference during the calculation process of the displacement vector to be described below. The first-acquired volume data may be used as the reference volume data, or the next-acquired volume data may also be used as the reference volume data. The acquisition method of volume data may be varied according to categories of the medical imaging apparatus needed to perform the medical image formation method. As described above, it may be possible to acquire the volume data by using any of the ultrasonic imaging method, the CT method, the tomosynthesis method, the MRI method, and the like.

The corresponding voxels between the reference volume data and the target volume data may be detected in operation 620, and the displacement vector with respect to the detected corresponding voxels may be calculated in operation 630. At least one piece of intermediate volume data with respect to the reference volume data and the target volume data may be generated by using the calculated displacement vector in operation 640. The operations from the corresponding voxel detection 620 to the intermediate volume data generation 640 are identical to those of FIGS. 26 to 28, and as such a detailed description thereof will herein be omitted for convenience of description.

The target volume data, the intermediate volume data, and the reference volume data may be rendered in operation 650. If the display unit to be used for image display can display the 3D image, volume data may be rendered at a left viewpoint and a right viewpoint. A detailed description of the rendering process is identical to those of the image processing apparatus. The rendered target volume data, the intermediate volume data, and the reference volume data may be displayed according to a time sequence in operation 660.

As a result, not only the 3D structure of the target object but also the 3D moving image that indicates movement of the target object may be displayed on the display unit. The intermediate volume data is generated according to the input order of the target volume data and the reference volume data, so that the resultant intermediate volume data may be displayed in real time. After total volume data is completely acquired, the intermediate volume data may be generated and displayed.

By generation of the intermediate volume data, the image may be displayed at a higher-speed volume rate than the volume rate of the scanner. For example, if two intermediate volume data are generated for every pair of reference volume data and target volume data, the image may be displayed at a double volume rate, as compared to the volume rate of the scanner.

According to the above-mentioned image processing apparatus, the medical imaging apparatus that includes the image processing apparatus, the ultrasonic imaging apparatus, the image processing method, and the medical image formation method, the intermediate volume data is generated from a plurality of 3D volume data obtained as time passes, resulting in implementation of a high-speed volume rate. Actually, the exemplary embodiments can obtain the same effect as in the case in which volume data is acquired at a higher volume rate than a previous volume rate applied for volume data acquisition, so that the movement of the target object can be more naturally expressed.

In addition, during the process of detecting the corresponding point between the reference volume data and the target volume data so as to generate the intermediate volume data, the voxel values of the contiguous voxels are also considered, so that accuracy of the corresponding point detection can be increased.

As is apparent from the above description, the imaging apparatus and the imaging method according to the exemplary embodiments can generate intermediate volume data from a plurality of volume data segments obtained as time passes, resulting in implementation of a high-speed volume rate.

Although a few exemplary embodiments have been shown and described, it will be appreciated by those of skill in the art that changes may be made in these exemplary embodiments without departing from the principles and spirit of the present inventive concept, the scope of which is defined in the claims and their equivalents.

What is claimed is:

1. An ultrasonic imaging apparatus comprising:
  an ultrasonic probe configured to repeatedly acquire an ultrasonic image signal at intervals of a predetermined time period in an elevational direction; and
  at least one processor configured to:
    generate reference volume data and target volume data by using the repeatedly acquired ultrasonic image signal,
    detect a reference voxel of the generated reference volume data and a corresponding target voxel of the generated target volume data, and generate a displacement vector that relates to the detected reference voxel and the detected target voxel, and generate at least one piece of intermediate volume data with respect to the reference volume data and the target volume data by using the generated displacement vector, wherein the at least one processor is further configured to detect the target voxel of the target volume data by using voxel values of all contiguous voxels of the reference voxel contained in the reference volume data.

2. The ultrasonic imaging apparatus according to claim 1, wherein the at least one processor is further configured to calculate a cost value by using a measurement of a similarity between a voxel of the reference volume data and a voxel of the target volume data, and to use the calculated cost value to detect the target voxel of the target volume data.

3. The ultrasonic imaging apparatus according to claim 2, wherein the at least one processor is further configured to calculate at least one message value propagated between the contiguous voxels contained in the reference volume data by using the calculated cost value.

4. The ultrasonic imaging apparatus according to claim 3, wherein the at least one processor is further configured to calculate a gradient value with respect to the contiguous voxels contained in the reference volume data, and to determine a weight to be applied to the calculated at least one message value based on the calculated gradient value.

5. The ultrasonic imaging apparatus according to claim 3, wherein the at least one processor is further configured to calculate a belief value that relates to both of the reference voxel of the reference volume data and the corresponding target voxel of the target volume data by using the calculated cost value and the calculated at least one message value.

6. The ultrasonic imaging apparatus according to claim 5, wherein the at least one processor is further configured to determine a voxel having a minimum belief value from among voxels of the target volume data to be the target voxel that corresponds to the reference voxel of the reference volume data.

7. The ultrasonic imaging apparatus according to claim 6, wherein the at least one processor is further configured to calculate the belief value based on a plurality of voxels contained in a predetermined search range of the target volume data in order to detect the target voxel that corresponds to the reference voxel of the reference volume data.

8. The ultrasonic imaging apparatus according to claim 7, wherein the at least one processor is further configured to detect a voxel of target volume data that corresponds to at least one voxel contained in a predetermined detection range of the reference volume data.

9. The ultrasonic imaging apparatus according to claim 8, wherein at least one from among the predetermined search range and the predetermined detection range gradually increases in size as an amount of movement of a target object becomes greater, and gradually reduces in size as the amount of movement of the target object becomes smaller.

10. The ultrasonic imaging apparatus according to claim 1, wherein the at least one processor is further configured to generate the intermediate volume data by using the reference volume data and the displacement vector.

11. The ultrasonic imaging apparatus according to claim 1, wherein the at least one processor is further configured to generate a first displacement vector that ranges from the reference volume data to the target volume data, and to generate a second displacement vector that ranges from the target volume data to the reference volume data.

12. An ultrasonic image processing method comprising:
repeatedly acquiring an ultrasonic image signal at intervals of a predetermined time period in an elevational direction;
generating reference volume data and target volume data by using the repeatedly acquired ultrasonic image signal;
detecting a reference voxel of the generated reference volume data and a corresponding target voxel of the generated target volume data;
generating a displacement vector that relates to the detected reference voxel and the detected target voxel; and
generating at least one piece of intermediate volume data with respect to the reference volume data and the target volume data by using the generated displacement vector,
wherein the detecting the reference voxel and target voxel includes detecting the target voxel of the target volume data by using voxel values of all contiguous voxels of the reference voxel contained in the reference volume data.

13. The ultrasonic image processing method according to claim 12, wherein the detecting the reference voxel and target voxel includes:
calculating a cost value by using a measurement of a similarity between a voxel of the reference volume data and a voxel of the target volume data, and using the calculated cost value to detect the target voxel of the target volume data;
calculating at least one message value propagated between the contiguous voxels contained in the reference volume data by using the calculated cost value; and
calculating a belief value that relates to both of the reference voxel of the reference volume data and the corresponding target voxel of the target volume data by using the calculated cost value and the calculated at least one message value.

14. The ultrasonic image processing method according to claim 13, wherein the detecting the reference voxel and target voxel includes:
determining a voxel having a minimum belief value from among voxels of the target volume data to be the target voxel that corresponds to the reference voxel of the reference volume data.

15. The ultrasonic image processing method according to claim 12, wherein the generating the at least one piece of intermediate volume data includes:
generating the intermediate volume data by using the reference volume data and the displacement vector.

16. The ultrasonic image processing method according to claim 15, wherein the generating the intermediate volume data includes:
generating the intermediate volume data by using a displacement vector to which a weight is applied according to a number and an order of pieces of intermediate volume data to be generated with respect to the reference volume data and the target volume data.

* * * * *